United States Patent [19]

Ishida et al.

[11] Patent Number: 5,305,425
[45] Date of Patent: Apr. 19, 1994

[54] METHOD OF AND APPARATUS FOR EVALUATING MEMBERSHIP FUNCTIONS OR RULES IN FUZZY REASONING SYSTEM

[75] Inventors: Tsutomu Ishida; Nobuo Tsuchiya; Kazuaki Shoji; Nobutomo Matsunaga, all of Kyoto, Japan

[73] Assignee: Omron Corporation, Kyoto, Japan

[21] Appl. No.: 768,675

[22] PCT Filed: Apr. 9, 1990

[86] PCT No.: PCT/JP90/00480
§ 371 Date: Dec. 30, 1991
§ 102(e) Date: Dec. 30, 1991

[87] PCT Pub. No.: WO90/13082
PCT Pub. Date: Nov. 1, 1990

[30] Foreign Application Priority Data

Apr. 14, 1989 [JP] Japan ............................. 1-93116
Apr. 14, 1989 [JP] Japan ............................. 1-95588
May 10, 1989 [JP] Japan ............................ 1-118072
Jun. 22, 1989 [JP] Japan ............................ 1-160547
Jul. 12, 1989 [JP] Japan ............................ 1-179418
Aug. 11, 1989 [JP] Japan ............................ 1-209044
Sep. 8, 1989 [JP] Japan ............................ 1-234454

[51] Int. Cl.$^5$ .......................... G06F 9/44; G05B 13/02
[52] U.S. Cl. ............................ 395/51; 395/76; 395/900
[58] Field of Search ................ 395/3, 900, 51, 61, 395/12, 76,

[56] References Cited

U.S. PATENT DOCUMENTS 5,140,669  8/1992  Zhang .................................. 395/3
5,189,728  2/1993  Yamakawa et al. ................. 395/51

FOREIGN PATENT DOCUMENTS 60-204002  10/1985  Japan ........................... G05B 13/00
3-43802    2/1991   Japan ........................... G05B 13/02

OTHER PUBLICATIONS

Chiu et al., "Real-Time Fuzzy Control: From Linguistic Rules to Implementation on a Chip", Proc. 2nd Intl. Symp. Methodologies for Intelligent Systems, Oct. 1987, 17-24.
Kaneko et al., "Expert System for Investment Based on Fuzzy Reasoning", Jour. Info. Processing Society of Japan, Aug. 1989, 963-969.
Endo et al., "Fuzzy Expert System Building Shell", Jour. Info. Processing Society of Japan, Aug. 1989, 948-956.
Togai InfraLogic, Inc., The Fuzzy Source, vol. 1 Iss. 1, Summer 1991.

Primary Examiner—Allen R. MacDonald
Assistant Examiner—Robert W. Doans
Attorney, Agent, or Firm—Dickstein, Shapiro & Morin

[57] ABSTRACT

For an input value, conformity grades are computed and are displayed for established membership functions. Alternatively, conformity grades and change rates thereof developed when a fuzzy reasoning system is operated are displayed. Alternatively, a change with respect to time of the input value is displayed to be superimposed onto a table representing the established rules. Alternatively, an output value resultant from a fuzzy reasoning conducted with a particular rule removed is compared with a fuzzy reasoning achieved by using all rules, thereby displaying the difference on a rule table. As above, various features in the fuzzy reasoning are extracted and are displayed so as to check adequacy of the established membership functions and rules.

13 Claims, 29 Drawing Sheets

Fig.9

| AMBIENT TEMPERATURE | 20°C | NS | ZR | PS | PM |
|---|---|---|---|---|---|
| | | 0.0 | 0.7 | 0.3 | 0.0 |

Fig.26

(ANTECEDENT)

| RULE No. | PROPOSITION 1 | | PROPOSITION 2 | | ... | PROPOSITION e | |
|---|---|---|---|---|---|---|---|
| | VARIABLE NAME | LABEL | VARIABLE NAME | LABEL | | VARIABLE NAME | LABEL |
| 1 | aaaa | NL | bbbb | NM | | eeee | NS |
| 2 | abaa | PL | bbbb | PM | | | |
| 3 | aaaa | PM | bcbb | PS | | | |
| ... | | | | | | | |
| r | abca | ZR | bcbb | ZR | | | |

(CONSEQUENT)

| VARIABLE NAME | LABEL |
|---|---|
| gggg | PL |
| gggg | PM |
| gggg | PS |
| ... | |
| hhhh | NS |

| VARIABLE No. | VARIABLE NAME | COUNTED VALUE | |
|---|---|---|---|
| 0 | a a a a | 15 | — M₂ |
| 1 | a b a a | 5 | |
| 2 | a b a c | 8 | |
| 3 | b b b b | 12 | |

Fig.30

| x\y | NL | NM | NS | ZR | PS | PM | PL |
|---|---|---|---|---|---|---|---|
| PL |  | NL | PL | PL |  |  | PL |
| PM |  | NM |  | PM |  | PL |  |
| PS |  | NS |  | PS | PS |  |  |
| ZR | NL | NM | NS | ZR | PS | PM | PL |
| NS |  |  | NS | NS |  | PS |  |
| NM |  | NL |  | NM |  | PM |  |
| NL | NL |  |  | NL | NL | PL |  |

Fig. 31

| x<br>y | NL | NM | NS | ZR | PS | PM | PL |
|---|---|---|---|---|---|---|---|
| PL | | | | | | | |
| PM | | | | | | | |
| PS | | | | | | | |
| ZR | | | | | | | |
| NS | | | | | | | |
| NM | | | | | | | |
| NL | | | | | | | |

Fig.32

| x\y | NL | NM | NS | ZR | PS | PM | PL |
|---|---|---|---|---|---|---|---|
| PL |  |  |  |  | z≥PS | z≥PS | z≥PS |
| PM |  |  |  |  | z≥PS | z≥PS | z≥PS |
| PS |  |  |  |  | z≥PS | z≥PS | z≥PS |
| ZR |  |  |  | ZR |  |  |  |
| NS | z≤NS | z≤NS | z≤NS |  |  |  |  |
| NM | z≤NS | z≤NS | z≤NS |  |  |  |  |
| NL | z≤NS | z≤NS | z≤NS |  |  |  |  |

Fig.34

| y \ x | NL | NM | NS | ZR | PS | PM | PL |
|---|---|---|---|---|---|---|---|
| PL |  | NL | PL | PL |  |  | PL |
| PM |  | NM |  | PM |  | PL |  |
| PS |  | NS |  | PS | PS |  |  |
| ZR | NL | NM | NS | ZR | PS | PM | PL |
| NS |  |  | NS | NS |  | PS |  |
| NM |  | NL |  | NM |  | PM |  |
| NL | NL |  |  | NL | NL | PL |  |

Fig.35

IF x = ZR AND y = ZR THEN z = ZR
IF x = NS AND y = ZR THEN z = NS
· 
· 
· 
· 
·

Fig.36

IF x = NM AND y = ZR THEN z = (ZR, NS, NM, NL)
· 
· 
· 
· 
·

METHOD OF AND APPARATUS FOR EVALUATING MEMBERSHIP FUNCTIONS OR RULES IN FUZZY REASONING SYSTEM

TECHNICAL FIELD

The present invention relates to a method of and an apparatus for evaluating membership functions or rules in a fuzzy reasoning system or for a fuzzy reasoning system.

BACKGROUND ART

Apparatuses are being developed for conducting a fuzzy reasoning and having various names such as a fuzzy controller, a fuzzy computer, and fuzzy inference operation apparatus. Most of these apparatuses execute a fuzzy reasoning in accordance with modus ponens fuzzy reasoning rules, which are so-called If, then rules.

In applications of the fuzzy reasoning system, it is quite important to appropriately establish kinds of input variables to be detected from a control object, kinds and contours of membership functions, reasoning rules, etc. These various parameters for the fuzzy reasoning are determined in many cases in consideration of experiences of experts or experienced workers, accumulation of know-how, and the like. However, even when the accumulation of the knowledge in the past is taken into consideration, problems may occur, such that some input variables and rules are not fully utilized, an optimal control cannot be accomplished because of inappropriateness of rules and membership functions, and so on. In consequence, essential matters for improvement of a fuzzy reasoning control also include observing, analyzing and evaluating roles in a fuzzy reasoning of the input variables, membership functions and rules once established and mutual relationships of a plurality of rules.

However, the research of the fuzzy reasoning applications has just been started and there has not been accomplished a satisfactory research thereof in the present situation.

DISCLOSURE OF THE INVENTION

The present invention has an object to provide a method of and an apparatus for evaluating appropriateness of membership functions established.

Moreover, the present invention has an object to provide a method of and an apparatus for evaluating appropriateness of fuzzy inference rules established.

An apparatus for evaluating membership functions or rules in a fuzzy reasoning system in accordance with the present invention is characterized by comprising means provided with a plurality of membership functions established for each of input variables of at least two kinds and a plurality of membership functions established for output variables of at least one kind for executing in response to an input value a fuzzy reasoning based on predetermined rules beforehand established, arithmetic means for computing, in an execution process of a fuzzy reasoning by the fuzzy reasoning execution means, a feature related to a fuzzy reasoning for an evaluation of a membership function or a rule, and means for outputting the computed feature.

A method of evaluating membership functions or rules in the fuzzy reasoning system in accordance with the present invention which keeps a plurality of membership functions established for each of input variables of at least two kinds and a plurality of membership functions established for output variables of at least one kind and which is responsive to an input value to execute a fuzzy reasoning based on predetermined rules beforehand established, is characterized by comprising computing, in an execution process of a fuzzy reasoning, a feature related to a fuzzy reasoning for an evaluation of a membership function or a rule and outputting the computed feature.

In accordance with a first mode of the present invention, in response to an input value supplied, a membership function related to the input value is retrieved, a conformity grade of the input value is computed for the retrieved membership function, and the input value, the membership function and the conformity grade are displayed in a format in which these items are related to each other.

In accordance with the first mode, since the input value, the membership function related thereto, and the conformity grade of the input value for the membership function are displayed in a form in which these items are related to each other, the appropriateness of the established membership function can be judged in a realtime fashion by visually checking the display. Furthermore, when the membership function is judged to be inappropriate, the membership function can be corrected.

In accordance with a second mode of the invention, when an input value is supplied, a conformity grade of the input value and a change rate thereof are computed such that a state of changes of the computed conformity grade and a change rate thereof is displayed with time set to the abscissa.

When the conformity grade is a conformity grade of an antecedent, the antecedent conformity grade and the change rate thereof are displayed for each rule. When the conformity grade is a conformity grade for a membership function, the conformity grade and the change rate thereof are displayed for each membership function.

In accordance with the second mode, when the antecedent conformity grade and the change rate thereof are displayed, changes thereof in the fuzzy reasoning process can be understood at a glance; consequently, similar rules and inappropriate rules can be detected. Moreover, one of the similar rules may be deleted to add a simple arithmetic operation in place thereof and the inappropriate rules may be deleted, thereby increasing stability of the fuzzy reasoning output value and the reasoning processing speed.

In accordance with a third mode of the invention, when an input value is supplied, there are computed display position coordinates of the input value in a rule table which represents for all rules established, in a form of a table, labels of antecedent membership functions and labels of consequent membership functions and a graphic image is displayed, the graphic image being superimposed onto the rule table and being drawn according to a change of the input value with respect to time based on the computed display position coordinates.

In accordance with the third mode, with use of a combination of the labels representing antecedent membership functions and the labels representing consequent membership functions, a rule table of a fuzzy reasoning is displayed, and then a graphic image presenting a change of the input value with respect to time is displayed to be superimposed onto the rule table, which consequently facilitates a visual recognition of the change of the input value with respect to time and which hence makes it possible to easily detect inappropriate rules.

In accordance with a fourth mode of the invention, an ordinary fuzzy reasoning is beforehand executed for all combinations of input variables in conformity with all rules established, thereby storing an output value representing a result of the reasoning. And, a trial fuzzy reasoning operation is accomplished, based on all remaining rules obtained by removing a particular rule from the established rules, for combinations of input variables within a predetermined range related to the removed rule, a difference is computed between an output value from the trial fuzzy reasoning operation and the output value representing the ordinary fuzzy reasoning result, and the difference is displayed or printed out as an output in association with the combinations of input variables.

In accordance with the fourth mode, a rule can be evaluated depending on the outputted difference. For example, in a case where the difference is zero or is very small, the particular rule is not considered to exert an essential influence on the fuzzy rule and hence can be removed. As a result, there can be established necessary minimum rules.

An apparatus for evaluating membership functions or rules in a fuzzy reasoning system in accordance with the present invention is characterized by comprising means provided with a plurality of membership functions established for each of input variables of at least two kinds and a plurality of membership functions established for output variables of at least one kind for executing in response to an input value a fuzzy reasoning based on predetermined rules beforehand established, means for storing a feature related to a fuzzy reasoning for an evaluation of a membership function or a rue obtained in an execution process of a fuzzy reasoning by the fuzzy reasoning execution means, and means for analyzing the membership functions or rules based on the stored feature.

A method of evaluating membership functions or rules in accordance with the present invention in a fuzzy reasoning system which keeps a plurality of membership functions established for each of input variables of at least two kinds and a plurality of membership functions established for output variables of at least one kind and which is responsive to an input value to execute a fuzzy reasoning based on predetermined rules beforehand established, is characterized by storing a feature obtained in an execution process of a fuzzy reasoning and related to a fuzzy reasoning for an evaluation of a membership function or a rule and analyzing membership functions or rules based on the stored feature.

In accordance with a fifth mode of the invention, the value obtained in the fuzzy reasoning process and related to an antecedent conformity grade is kept by using a predetermined physical quantity as a variable for a predetermined range of the physical quantity, similarity is computed between rules for the retained antecedent conformity grades, and the rules are classified into groups based on the computed similarity.

The values related to the conformity grade include the conformity grade and the change rate of the conformity grade.

The values related to the conformity grade are most generally arranged along a time axis with time set as a variable such that the similarity will be computed between rules along the time axis. However, another physical quantity (for example, temperature) may naturally be set as a variable to obtain a change of the value related to the conformity grade so as to compute the similarity between the rules based thereon.

In accordance with the fifth mode, since a plurality of rules can be classified into groups along a time axis or an axis of another physical quantity, there can be known necessary and indispensable rules for each of these axes (variables).

With the provision, it is possible to select necessary rules depending on a kind of variables so as to conduct a fuzzy reasoning by use of only the selected rules, thereby increasing the processing speed.

Moreover, since the presence and absence of duplication of rules can be checked in the group of rules, unnecessary rules can be dispensed with. The check for duplicated rules is useful when selecting necessary minimum rules.

An apparatus for evaluating rules for a fuzzy reasoning system in accordance with the present invention is characterized by comprising input means for establishing rules for a fuzzy reasoning, means for checking rules inputted by the input means and means for outputting a result of the check.

A method of evaluating rules for use in a fuzzy reasoning system in accordance with the present invention is characterized in that in an apparatus including input mean for establishing rules for a fuzzy reasoning, when a rule is established by the input means, the established rule is checked and a result of the check is outputted.

In accordance with a sixth mode of the invention, there are counted a value related to a utilization frequency of each variable of an established fuzzy rule to output the count result as a display or a printout.

In accordance with the sixth mode, after a fuzzy reasoning rule is established, a utilization frequency is automatically counted and outputted for each variable used in the rule; consequently, the overall balance related to utilization of the variables in the established rule, a grade of importance of each variable, and the like can be obtained to achieve the evaluation.

In accordance with a seventh mode of the invention, there are beforehand stored adequate establishing ranges of consequent membership functions for combinations of antecedent membership functions. And, when a consequent membership function is inputted from the input means, a check is made to determine whether or not the inputted membership function is within the adequate range such that when the inputted consequent membership function is judged to be beyond the adequate range, the condition is notified.

In accordance with the seventh mode, each time a fuzzy reasoning rule is established, a check is made to determine whether or not the inputted consequent membership function is within the predetermined appropriate range such that when the function is beyond the range, the condition is notified; consequently, the operator can recognize that the establishing of the consequent membership function has been erroneous. Resultantly, a wrong establishing of a rule due to an input operation error can be prevented from occurring.

BRIEF DESCRIPTION OF THE DRAWINGS

FIGS. 5 to 9 shows a first embodiment.

FIG. 5 is a flowchart showing a processing procedure of a membership function establishing operation.

FIG. 6 is a flowchart showing a processing procedure of evaluating an established membership function.

FIG. 7 shows a display example of input values, membership functions, and conformity grades.

FIG. 8 shows a display example of a state of a membership function corrected.

FIG. 9 shows another display example of input values, membership functions, and conformity grades.

FIG. 10 is a flowchart showing a processing procedure of evaluating rules.

FIG. 11 is a graph showing a state of a change of a conformity grade with respect to time.

FIG. 12 is a graph showing a state of a change with respect to time of a conformity grade change rate.

FIG. 13 is a graph showing another example of a change with respect of time of a conformity grade change rate.

FIG. 14 is a flowchart showing a display processing procedure for a rule evaluation.

FIG. 15 shows a display example of a graphic image including a rule table and a change of input values with respect to time displayed over the table in a superimposed manner.

FIG. 16 shows another display example.

FIG. 17 is a flowchart showing a rule evaluation processing procedure.

FIG. 18 shows a table for storing therein fuzzy reasoning result data and difference data.

FIG. 19 shows a difference display example.

FIG. 20 is a functional block diagram of the fifth embodiment.

FIG. 21 is a graph showing an example of the conformity grade of rule.

FIG. 22 is a graph showing a correlation of the conformity grade between rules.

FIGS. 23 to 25 are functional block diagrams respectively showing first, second, and third variation examples.

FIGS. 26 to 29 show a sixth embodiment.

FIG. 26 shows the structure of data representing established rules.

FIG. 27 shows a storage area of the total rule count.

FIG. 28 shows a storage area employed to count a utilization frequency of each variable.

FIG. 29 is a flowchart showing a processing procedure used to count and to display the utilization frequency of each variable.

FIGS. 30 to 36 show a seventh embodiment.

FIG. 30 shows an example of the rule table for a control operation.

FIG. 31 shows an example of the rule table for an establishing operation.

FIG. 32 shows an example of the rule table for a judging operation.

FIG. 33 is a flowchart showing the procedure of a rule check processing to be executed when a rule is established.

FIG. 34 shows another display example of the rule table for a control operation.

FIGS. 35 and 36 show other display examples of established rules.

BEST MODE FOR CARRYING OUT THE INVENTION (1) Overall configuration of fuzzy control system FIG. 1 shows the overall configuration of a fuzzy control system including a fuzzy controller as an example of a fuzzy reasoning apparatus.

Figure 1:
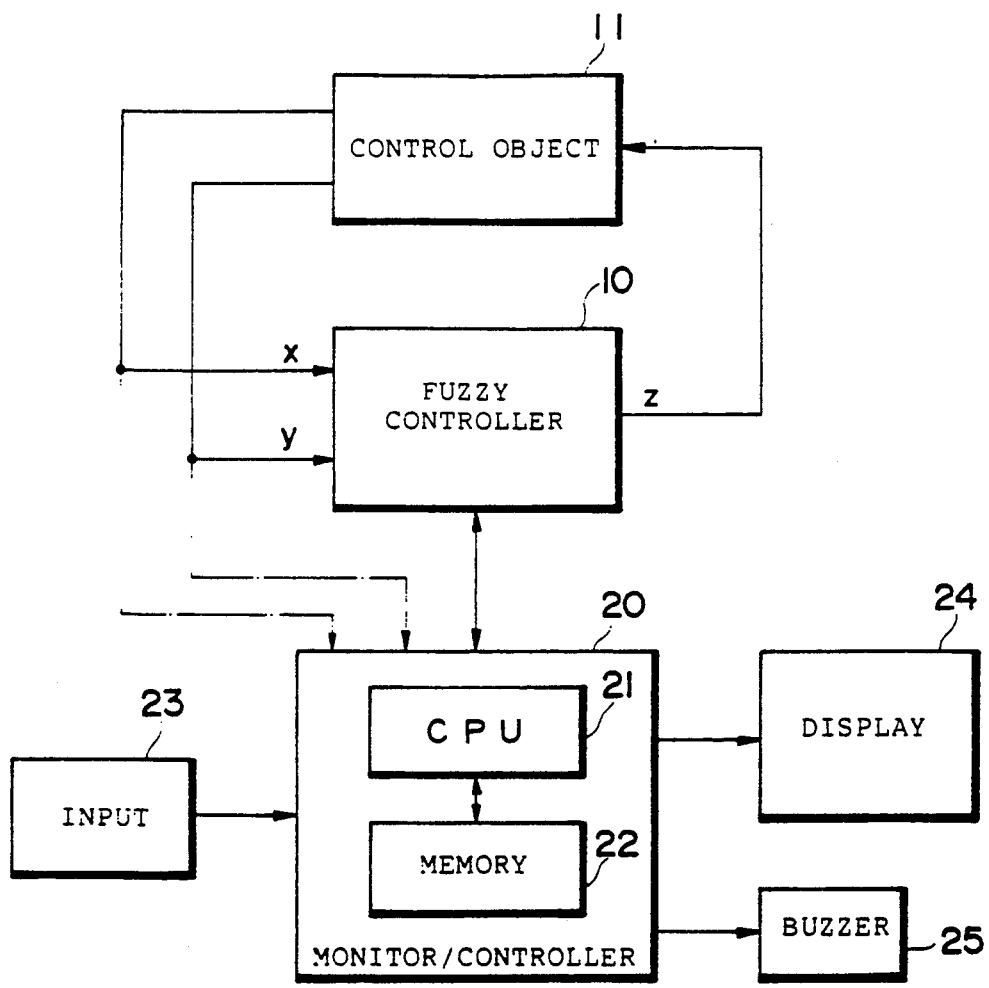
FIG. 1 is a block diagram showing the overall configuration of a fuzzy control system.

The fuzzy controller 10 controls a control object (e.g. a heating furnace, a motor, etc.) 11. The fuzzy controller 10 receives as inputs thereto controlled variables (a measured temperature, a measured speed, change rates thereof, etc.) attained from the control object 11 and then achieves a fuzzy reasoning by use of membership functions beforehand established and on the basis of reasoning rules beforehand established so as to supply the control object 11 with a manipulated variable (a current value, a command as to speed, etc) obtained by defuzzifying the reasoning result.

The fuzzy controller 10 may be of an analog or digital type and may be a fuzzy-dedicated controller having an architecture exclusive for the fuzzy reasoning or may be implemented by a binary-type computer (including a memory) (for example, a micro computer, a so-called personal computer, or the like) programmed to enable the fuzzy reasoning to be executed.

The fuzzy controller 10 is connected to a monitor and controller (monitor/controller) 20. The monitor/controller 20 establishes membership functions, rules, and the like to be adopted by the fuzzy controller 10, monitors or observes the operation of the fuzzy controller 10, and evaluates the membership functions and the rules based on the observed data. The monitor/controller 20 includes a CPU 21 for conducting the operations above and a memory 22 for storing therein programs for the CPU 21, inputted or established data, data collected from the controller 10, etc. Moreover, connected to the monitor controller 20 are an input unit 23 including a keyboard, a mouse, and the like for inputting or establishing membership functions, rules, and other data, a display 24 including, for example, a CRT for displaying established membership functions, rules, etc. and a reasoning process, an observation result, etc. of the controller 10, and a buzzer 25 for outputting an alarm. In a case where the fuzzy controller 10 is implemented by a computer, both of the functions of the controller 10 and the monitor/controller 20 may be realized by one unit of computer.

Figure 2:
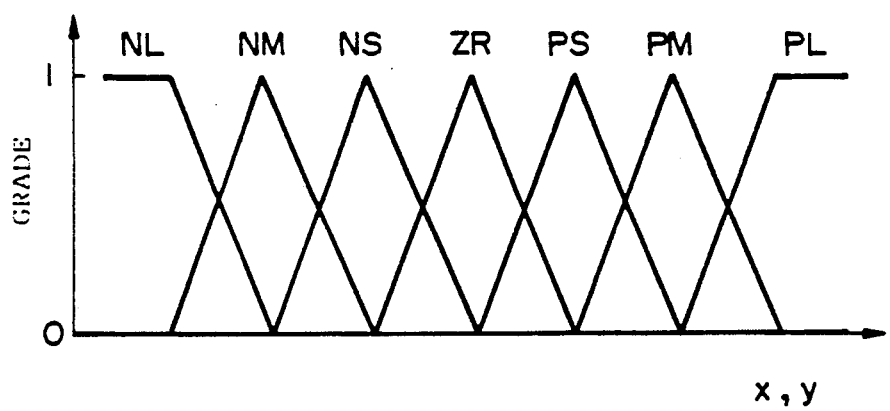
FIG. 2 is a graph showing an example of membership functions for input variables.
Figure 3:
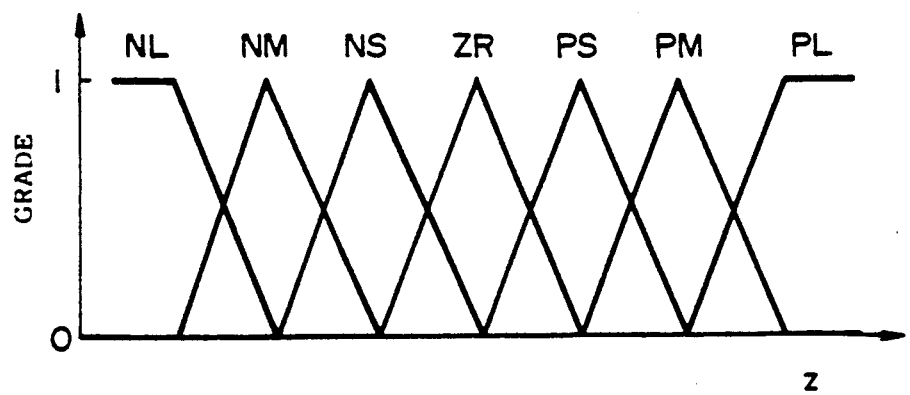
FIG. 3 is a graph showing an example of membership functions for an output variable.

For simplification of explanation, for the kinds (input variables) of inputs of the fuzzy controller, there are assumed two kinds x and y, whereas the output variable of the fuzzy controller 10 is assumed to be z. FIGS. 2 and 3 respectively show an example of membership functions respectively established for the input variables x and y and an example of membership functions established for the output variable z. A membership function generally has a value (grade) ranging from 0 to 1. Letters PL, PM, PS, ZR, NS, NM and NL are linguistic information (to be referred to as labels hereinbelow) representing membership functions in which P, N, S, M, L and ZR stand for positive, negative, small, medium, large, and almost zero, respectively. For example, PS and NL express a small positive value and a large negative value, respectively. The contour of membership functions is not limited to a rectangular form as shown in this diagram, namely, a membership function of an arbitray contour may be adopted. Moreover, the membership functions are not limited to the seven kinds above, that is, depending on a feature of a control object, there may be established an arbitrary number of kinds of membership functions.

As a representative fuzzy reasoning rule, there has been a so-called If, then rule for a modus ponens reasoning. This is expressed, for example, as follows.

Rule 1

If x=PM, y=PL, then z=NS

Rule 2

If x=PS, y=PM, then z=NM

Rule r

If x=NM, y=NL, then z=PL

If x=PM, y=PL (in the case of rule 1) is called an antecedent, whereas then z=NS (in the case of rule 1) is called a consequent.

Here, the number r has naturally an arbitrary value.

Figure 4:
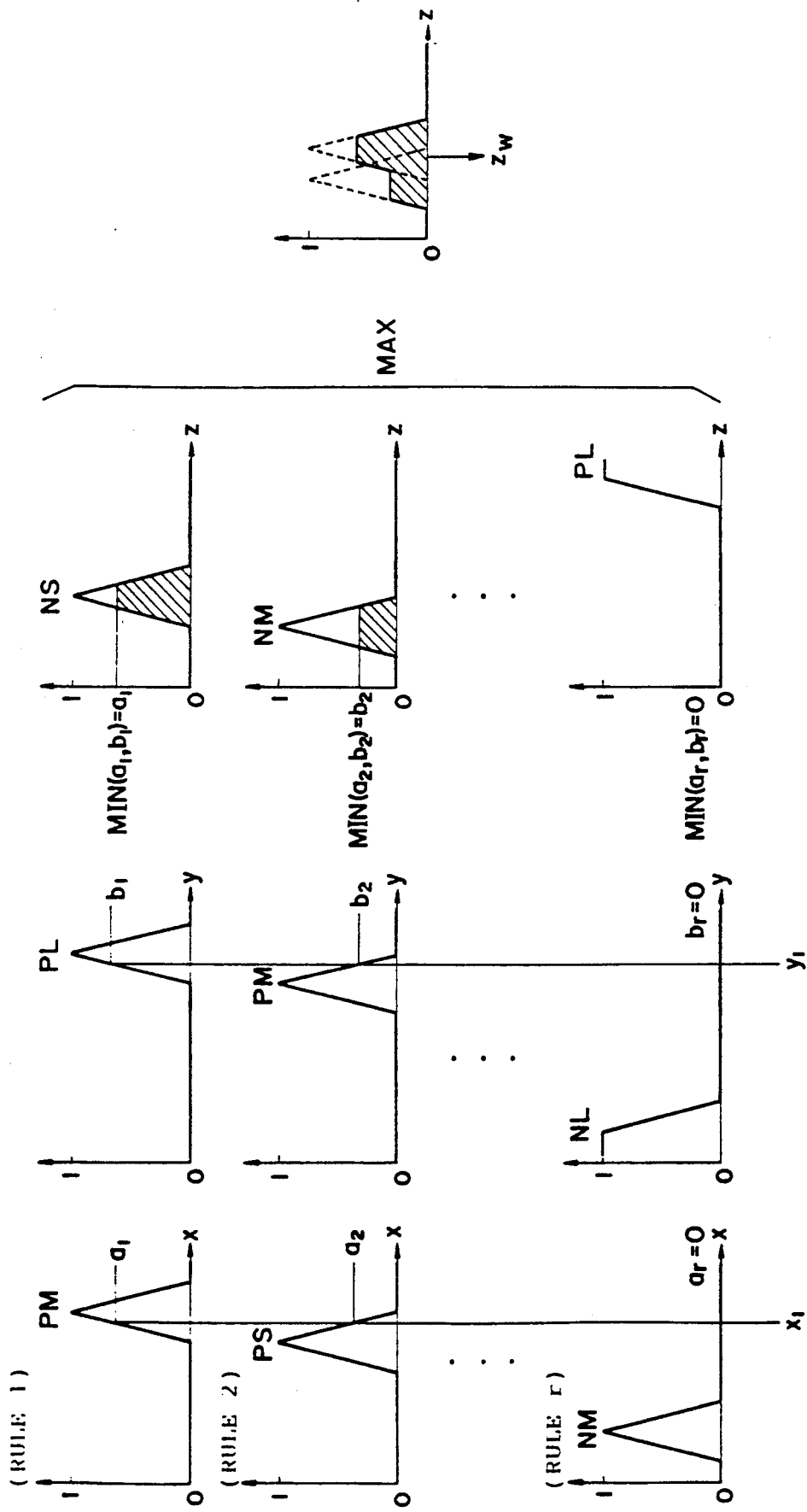
FIG. 4 shows a process of a fuzzy reasoning conforming to MIN-MAX operation rules.

FIG. 4 shows a process of a fuzzy reasoning executed depending on the rules above by use of the MIN-MAX operation rule.

When an input $x_1$ is supplied, there is attained for each rule a grade of conformity of the input $x_1$ for a membership function related to an input variable x (a membership function value when the input is supplied as a variable; this is called a conformity grade for the membership function). In FIG. 4, these conformity grades are expressed as $a_1, a_2, \ldots, a_r$. Similarly, when an input $y_1$ is supplied, there are obtained conformity grades $b_1, b_2, \ldots, b_r$ for the membership function related to an input variable y. Next, for each rule, an MIN operation (a selection for a smaller item), namely, MIN ($a_i$, $b_i$) is conducted between the conformity grade $a_i$ ($i=1$ to r) of the input $x_1$ and the conformity grade $b_i$ of the input $y_1$. Results of the MIN operation are called conformity grades of the respective rules or conformity grades of antecedentes of the respective rules. Subsequently, for each rule, depending on the obtained antecedent conformity grade MIN($a_i$, $b_i$), the membership function of the consequent is truncated. In FIG. 4, the truncated consequent membership function (fuzzy set) is indicated with inclined lines. An MAX (logic union operation) is achieved for the truncated consequent membership functions for all rules. A result of the MAX operation represents a result of the fuzzy reasoning. When the MAX operation result is defuzzified, for example, through an operation attaining a center of gravity, there is obtained a determinate value $z_w$. This value $z_w$ is outputted from the fuzzy controller 10.

(2) First embodiment (evaluation of established membership function)

Let us consider an example of a case where temperature of a heating furnace (control object) is controlled by a fuzzy controller 10. The input variable x is an ambient temperature and the input variable y is a temperature of the heating furnace. The input variables of the fuzzy controller 10 may necessarily include, in addition, a change in temperature of the heating furnace (a value obtained by differentiating the temperature of the heating furnace with respect to time) and the like. The output variable z is an command value of a current to be fed to a heater for heating the heating furnace.

In this embodiment, appropriateness of an established membership function is evaluated.

Figure 5:
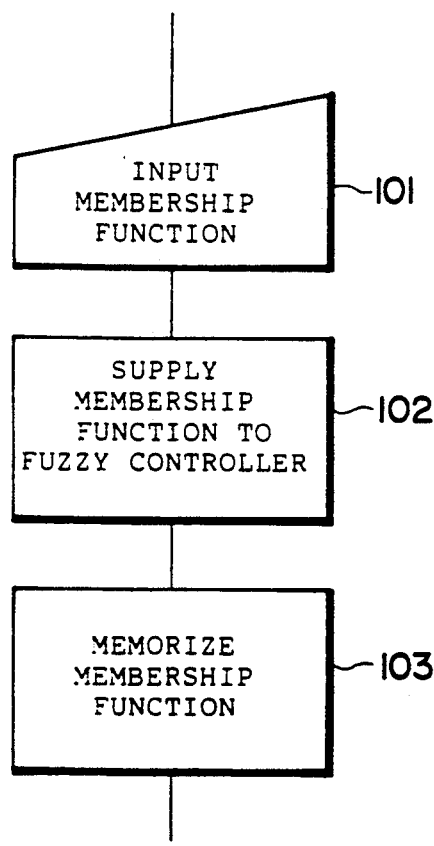

FIG. 5 shows a processing procedure used to establish a membership function in the monitor/controller 20. A membership function to be employed by the fuzzy controller 10 for a fuzzy reasoning is inputted from the input unit (keyboard) 23 of the monitor/controller 20.

When a membership function of an antecedent is inputted from the input unit 23 (step 101), data representing the inputted membership function is supplied to the fuzzy controller 10 (step 102) and is stored in the memory 22 (step 103).

When the data representing the inputted membership function is supplied, the fuzzy controller 10 stores, if the controller 10 has a memory, the data in the memory and establishes, if the controller has a membership function generator, the data as a parameter in the membership function generator. Similarly, a fuzzy reasoning rule is also naturally established.

Figure 6:
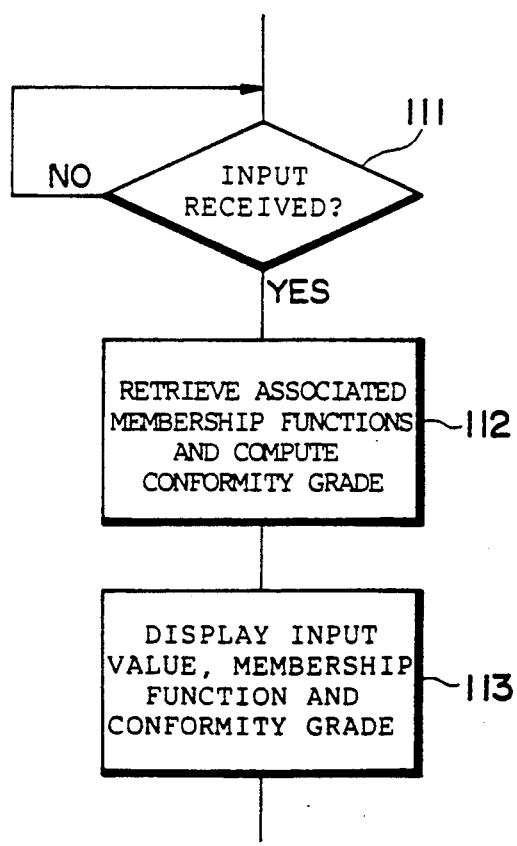

FIG. 6 shows the operation of the monitor/controller 20 when the fuzzy controller 10 achieves the control operation. Here, only one kind of input variable x (ambient temperature) will be mentioned.

An ambient temperature x measured by a sensor (not shown) is inputted to the fuzzy controller 10 and is supplied via the fuzzy controller 10 or directly from the sensor to the monitor/controller 20 (step 111). Then, from the membership functions already established and stored in the memory 22, membership functions which are related to the ambient temperature and for which the input temperature is within a range thereof are retrieved, and conformity grades of the input temperature are computed for the membership functions (step 112) Thereafter, the input temperature, retrieved membership functions, and computed confomity grades are presented on the display 24 in a form in which these items are related to each other.

Meanwhile, naturally, the fuzzy controller 10 accomplishes a fuzzy reasoning based on the input values and depending on the established membership functions and rules so as to output a current command to control the heating furnace, thereby conducting the heating furnace control.

Figure 7:
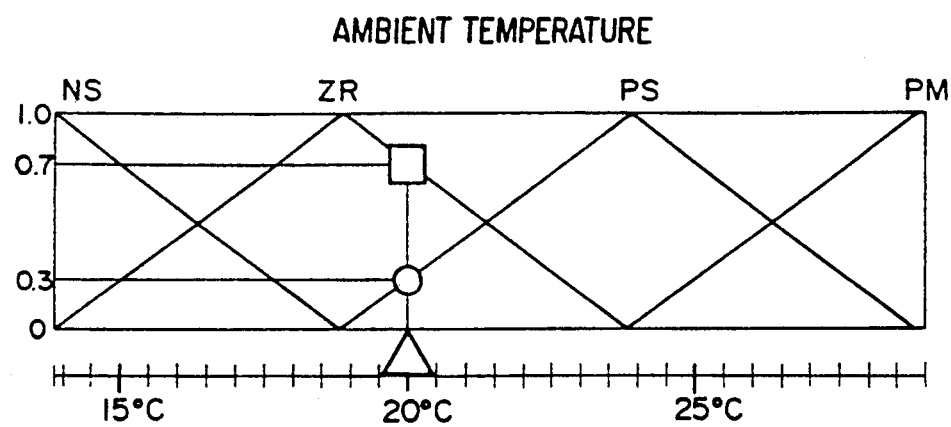

FIG. 7 shows a display example of a display on a CRT of the display 24. The upper-most row is used to present the item "ambient temperature" of the input variable. The lower-most row is employed to display scale marks of the ambient temperature such that an input value (20° C. in this example) is presented along the scale marks by a triangular symbol. Moreover, the intermediate rows are utilized to display, in association with the scale marks, the retrieved membership functions and the conformity grades. Although membership functions related to the input value are those having the labels ZR and PS, membership functions NS and PM in the periphery thereof are also presented for convenience. A conformity grade of the input value (20° C.) is 0.7 for the membership function ZR and is 0.3 for the membership function PS, and these are displayed with a rectangle and a circle on straight lines representing the associated membership functions.

As above, the input values and the conformity grades are presented respectively with symbols having different shapes, which facilitates discrimination between them. These may be displayed in different colors or may be blinked in the display. Viewing the display above, the operator of the system can recognize in a realtime manner the conformity grade of the actual environmental temperature for each membership function and can judge to determine whether or not the establishing of the membership function is appropriate. Thereafter, in a case where the establishing of the particular membership function has been judged to be inappropriate, the operator can correct the membership function, while visually checking the display, through an operation of the keyboard of the input unit 23.

Figure 8:
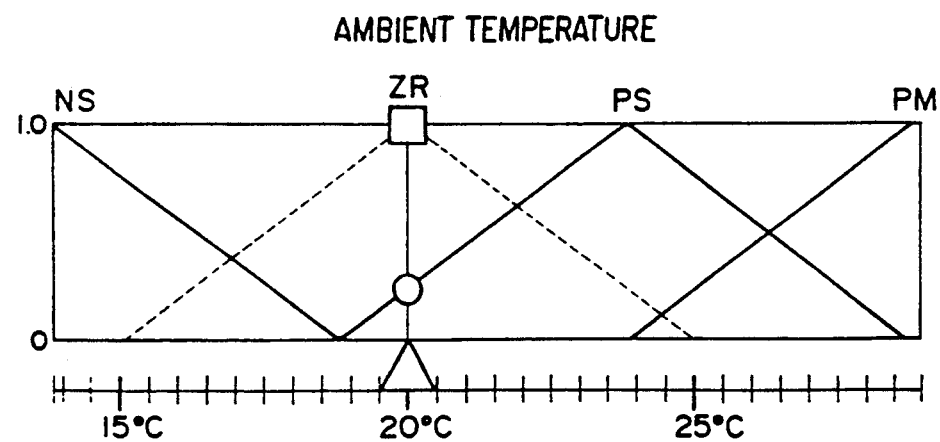

In this embodiment, the labels ZR, NS and PS mean an adequate temperature (ordinary), a slightly low temperature, and a slightly high temperature. Consequently, for example, in a case where the operator has a feeling that the ambient temperature is an ordinary temperature, the conformity grade for the membership function ZR must be 1.0 or in the vicinity thereof. In consequence, since the conformity grade 0.7 of the membership function ZR shown in FIG. 7 is inappropriate, the position of the membership function ZR is modified as indicated by broken lines in FIG. 8. Naturally, the contour of the membership function may be modified. In relation to the modification of the membership function ZR, the associated membership functions (NS, PS, etc) are naturally modified.

FIG. 9 shows another display example. Here, the input variable name "ambient temperature" is displayed with characters and the input value "20° C." is presented with numeric characters. Moreover, the labels NS, ZR, PS and PM of the membership functions are displayed with characters and in association therewith, the conformity grades 0.0, 0.7, 0.3, and 0.0 of the input value for these membership functions are presented with numeric characters.

As above, in this embodiment, an input value, membership functions related to the input value, and conformity grades of the input value for the membership functions are displayed in a form in which these items are related to each other; consequently, viewing the display, the operator can judge to determine, in a realtime fashion, whether or not the established membership function is appropriate. Furthermore, when the judgement results in an inappropriateness, the displayed membership function can be modified.

(3) Second embodiment (evaluation of established rule)

The second embodiment is related to an evaluation of an established rule. For simplification of explanation, it is assumed that the fuzzy controller 10 and the monitor/controller 20 are implemented by one unit of computer.

Membership functions and rules for the fuzzy reasoning are inputted from the input unit 23 to be stored in the memory. Whether or not the rule thus established is appropriate is checked as follows in a trial operation prior to an actual control or operation of the contol object.

Figure 10:
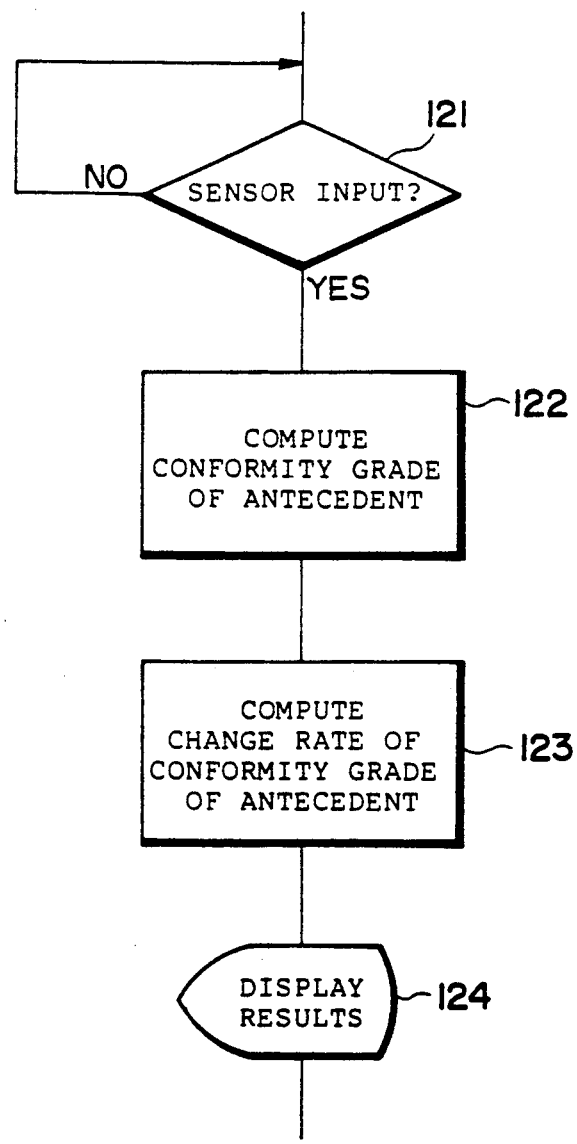
FIGS. 10 to 13 show a second embodiment.

Referring to FIG. 10, when input values for the input variables x and y are inputted from the respective sensors (step 121), an antecedent conformity grade (the MIN operation result described above) is computed for each rule (step 122); subsequently, a change rate of the antecedent conformity grade is computed (step 123). In a case where the input value is sampled at a sampling interval $\Delta t$, assuming that the antecedent conformity grade is $\alpha_{k-1}$ for the previous sampling and the antecedent conformity grade is $\alpha_k$ for the present sampling, the change rate thereof is obtained from $(\alpha_k - \alpha_{k-1})/\Delta t$. The antecedent conformity grade and the change rate thereof thus obtained are displayed in a manner associated with a passage of time for each rule on the CRT screen of the display 24 with time set to the abscissa as shown in FIGS. 11 and 12 (step 124).

Figure 11:
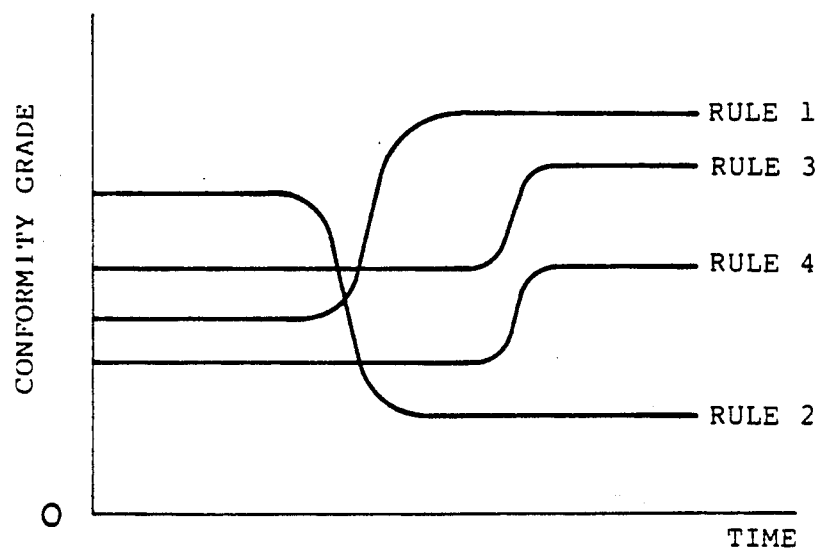
Figure 12:
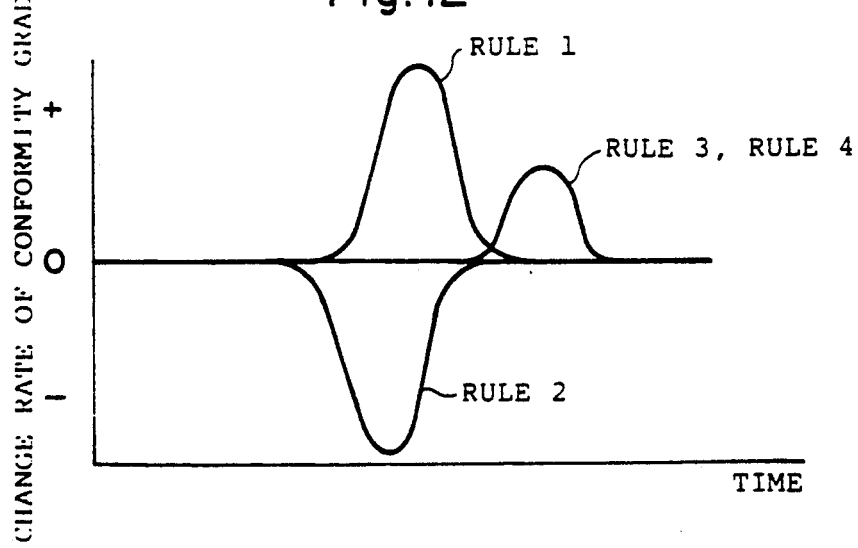

FIG. 11 shows a state in which the antecedent conformity grade varies along the time axis and FIG. 12 shows a state in which the change rate of the antecedent conformity grade alters along the time axis wherein four rules i.e. rules 1 to 4 are shown for simplicity in both diagrams. In FIG. 11, the conformity grade of rule 1 abruptly increases at an intermediate position of the time axis, and conversely, the conformity grade of rule 2 abruptly decreases. Although the conformity grades of rules 3 and 4 are different from each other, the conformity grades increase in a similar fashion at substantially an identical position of time. In association therewith, the conformity grade change rates develop such that the change rate of rule 1 has a peak projecting to a positive direction at an intermediate position of the time axis and the change rate of rule 2 has a peak projecting to a negative direction in the proximity of the same position of the time axis. Moreover, rules 3 and 4 have peaks toward the positive direction at a position behind the peak of rule 1.

Based on a visual check of the display above, it is found that rules 3 and 4 have an identical conformity grade change rate and hence these rules can be processed as sililar rules. That is, assuming the antecedent conformity grade of rule 3 is $\alpha_3$, the antecedent conformity grade of rule 4 becomes to be c $\alpha_3$(c is a constant); in consequence, the computation of the antecedent conformity grade of rule 4 is unnecessitated. In such a case, consequently, in the antecedent conformity grade processing of the fuzzy reasoning program, after the conformity grade $\alpha_3$ of the antecedent is computed for rule 3, the antecedent conformity grade of rule 4 need only be created by using the conformity grade $\alpha_3$ of rule 3. As a result, the operation speed of the fuzzy reasoning can be increased. The reasoning processing can be similarly simplified, in addition to a case where the conformity grade change rates are equal to each other as described above, for rules of which the conformity grade change rates have an identical absolute value and possess signs (positive or negative) opposite to each other.

Figure 13:
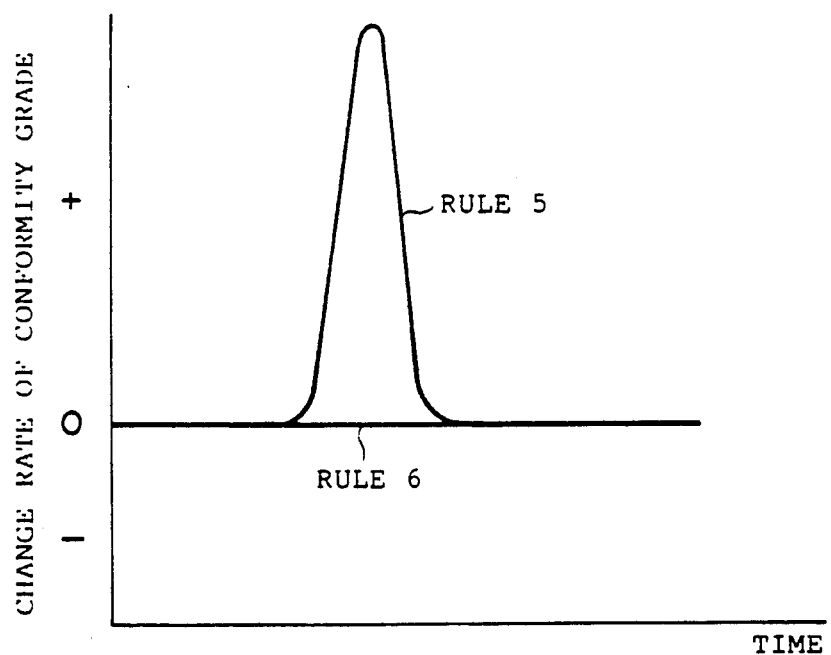

FIG. 13 shows another display example wherein for rule 5, an abrupt and abnormal change occurs in the antecedent conformity grade for a input value at a certain time. In such a case, rule 5 is assumed to be inappropriated and is hence deleted. In contrast thereto, for rule 6, the antecedent conformity grade rarely changes with respect to time. For rule 6 of this type, by replacing the antecedent conformity grade with a constant, the number of rules may also be minimized.

In accordance with this embodiment, since states of changes in the antecedent conformity grade and the change rate thereof during the fuzzy reasoning process can be presented on the display, similar rules can be detected and inappropriate rules can be found. Thereafter, one of the similar rules may be deleted to add a simple operation in place thereof and inappropriate rules may be deleted so as to increase stability of the fuzzy reasoning output value and the reasoning processing speed.

In the embodiment above, although the sensor output obtained from the control object is employed as the input, a pseudo-input generator may be disposed to scan the input values from the minimum value thereof to the maximum value thereof or may change the input values depending on an appropriate model, thereby supplying the input to the fuzzy controller. In a case where the pseudo-input is supplied and the input values are scanned, the conformity grade and the change rate thereof are displayed with the input values set to the abscissa, thereby clearly presenting a state wherein the conformity grade and the change rate thereof vary with respect to the change of the input value. Moreover, in the embodiment above, the antecedent conformity grade and the change rate thereof are obtained and are displayed; however, it is also possible to obtain and to display the conformity grade of each membership function of the antecedent and the change rate thereof. Furthermore, in the description of the embodiment above, the fuzzy controller 10 and the monitor/controller 20 are realized by one unit of computer; however, these controllers may be disposed as separate units. In this case, it is only required that processing of the steps 121 and 122 of FIG. 10 is conducted by the fuzzy controller 10 to transmit the processing result to the monitor/controller 20, which achieves processing of the steps 123 and 124. Alternatively, the monitor/controller 20 may be provided with a fuzzy reasoning program such that the monitor/controller 20 conducts in response to an input a fuzzy reasoning in a simulated manner and executes processing of the steps 121 to 124.

(4) Third embodiment (evaluation of established rule)

The third embodiment evaluates, like the second embodiment, an established rule; however, the items displayed on the display screen are different from those of the second embodiment.

Figure 14:
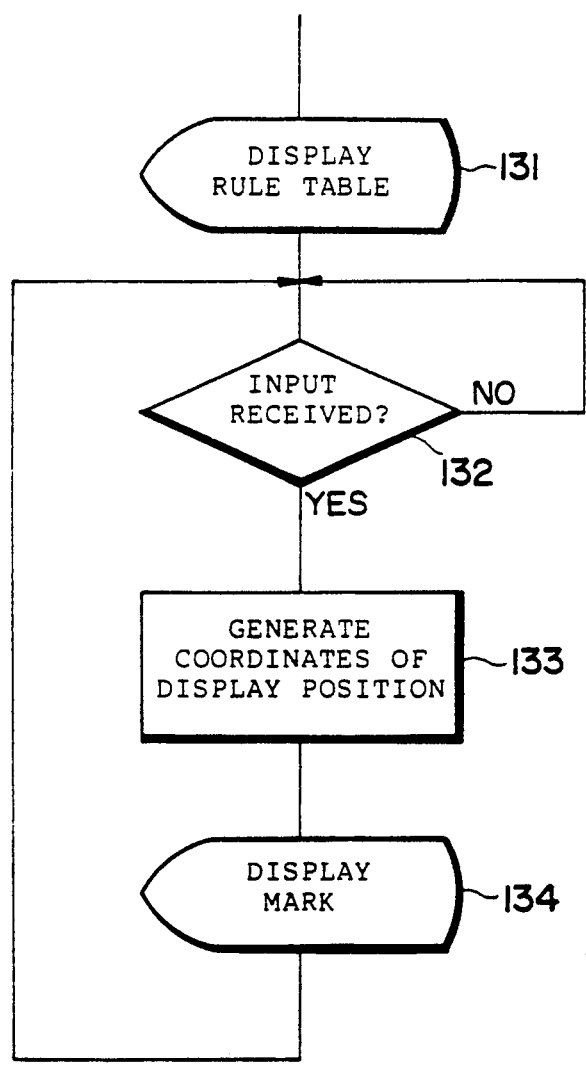
FIGS. 14 to 16 show a third embodiment.
Figure 15:
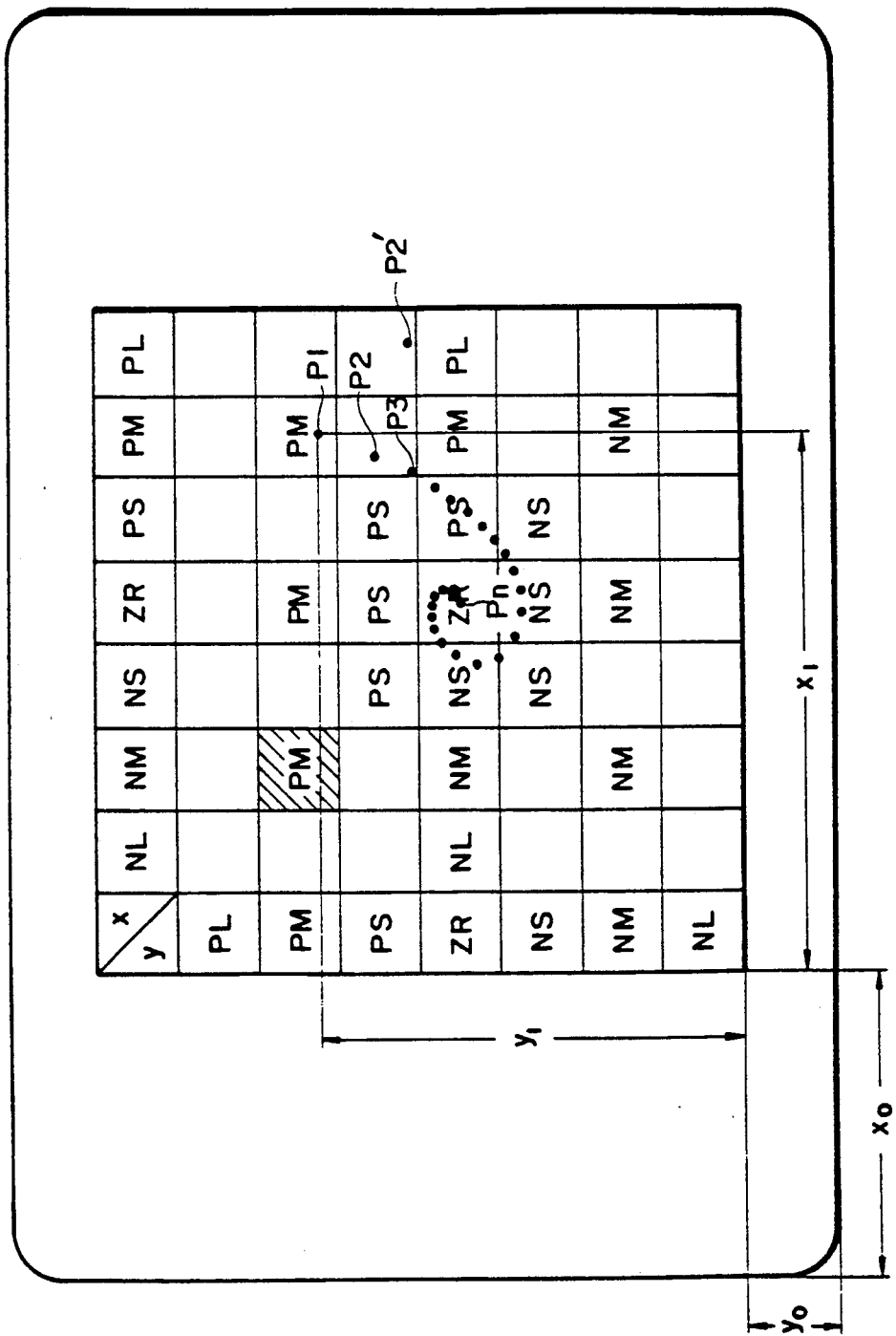

The display processing procedure to be achieved by the CPU 21 for the monitor/controller 20 will be described with reference to FIG. 14. An example of an image displayed on the display screen of the display 24 is shown in FIG. 15.

A table representing rules already established and stored in the memory 22 or in the memory of the fuzzy controller 10 is displayed (step 131). In FIG. 15, labels of membership functions established for the input variable x and labels of membership functions established for the input variable y are presented along the abscissa and the ordinate, respectively. A membership function label indicated in a cell at an intersection associated with a label along the abscissa and a label along the ordinate is related to the output variable. For example, the cell denoted by the hatching expresses a rule "If x=NM, y=PM, then z=PM".

Next, when inputs $x_1$ and $y_1$ are supplied from sensors disposed on the control object 11, there are computed display position coordinates on the display screen for these inputs (step 133). Since the coordinates of the input values are given as $(x_1,y_1)$ in the rule table, the display coordinates on the display screen can be obtained by adding the coordinates $(x_0,y_0)$ of the origin of the rule table on the display screen to the input values $(x_1,y_1)$. Namely, the display coordinates of the input values are $(x_0+x_1, y_0+y_1)$. At a position determined by the coordinates $(x_0+x_1, y_0+y_1)$, the first point mark P1 is displayed (step 134).

Each time an input value is supplied (for each sampling of an input value), the computation is repeatedly processed to sequentially display point marks P2, P3, ..., Pn. It is favorable that the point marks previously displayed are not cleared i.e. are kept remained.

In the process in which the control object 11 is controlled by the fuzzy controller 10, the input value is changed and an output value representing a fuzzy reasoning result based on the input value is also varied in association therewith. In a case where the control is properly achieved, the input value converges on a fixed value, and the output value also converges on a fixed value in relation thereto. Consequently, the point marks P1 to Pn sequentially move toward the center of the image.

As above, the point marks representing the input values are sequentially presented on the screen of the display 24, which hence facilitates a visual recognition of the change with respect to time of the input value. In a case, unlike in the display example shown in FIG. 15, where the point marks do not move toward a point or where quite a long period of time is required, although the point marks move toward a point, before the values are converged on the fixed value, it is judged that the control is not appropriately achieved. In this case, it is found that a rule associated with either one of the point marks P1 to Pn is inappropriate.

For example, the point mark P1 shows that the rule "If x=PM, y=PM, then z=PM" functions most strongly in the reasoning. At the next sampling point of time, when a point mark is displayed at a position considerably deviated from the direction toward the center of the image as shown by P2', it is judged that a result of the reasoning using the rule above is incorrect, namely, the rule "If x=PM, y=PM, then z=PM" is inappropriate. In this case, the rule undergoes a modification.

Conventionally, in a case where it is found that the fuzzy control cannot be properly accomplished, the whole rules are required to be reconsidered and the modification thereof takes a large amount of labor. In accordance with this embodiment, since which one of the rules is inappropriate can be recognized at a glance, the modification of the rule can be easily achieved.

Figure 16:
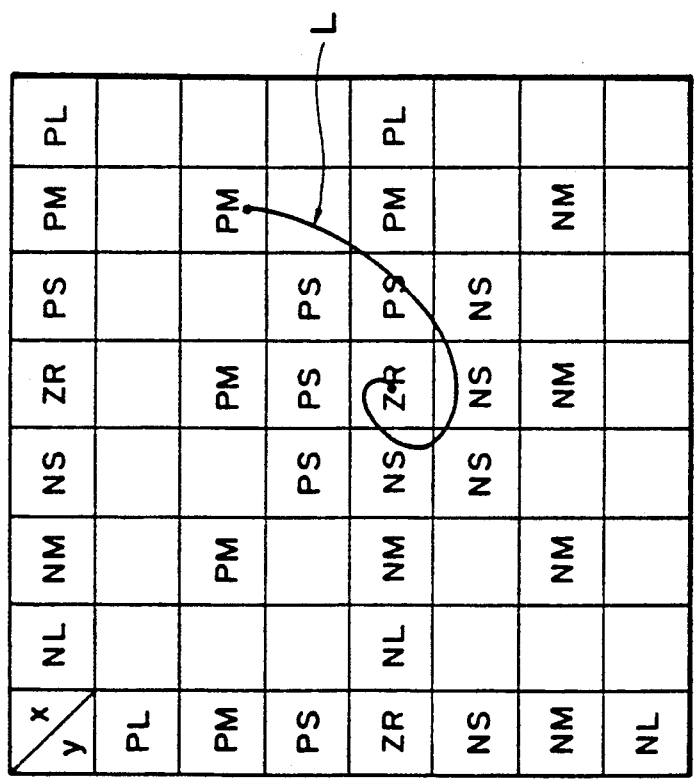

FIG. 16 shows another display example in which positions of input values are presented by a line (locus) L drawn along a lapse of time.

In the description of the embodiment above, two kinds of input variables are employed; however, in a case where three kinds of input variables are used, an image of a three-dimensional constitution is displayed, or two rule tables in a two-dimensional constitution are displayed.

As above, in accordance with this embodiment, combinations of labels representing antecedent membership functions and those representing consequent membership functions are adopted to display a table of fuzzy reasoning rules, and a graphic image representing a change with respect to time of the input value is displayed to be superimposed onto this table, which consequently facilitates a visual recognition of the change with respect to time of the input value and hence inappropriate rules can be easily judged.

(5) Fourth embodiment (evaluation of established rule)

The fourth embodiment also relates to an evaluation of an established rule. To simplify explanation, let us assume that the fuzzy controller 10 and the monitor/conoller 20 are materialized with one unit of computer. However, also in this embodiment, it is natural that the fuzzy controller 10 and the monitor/controller 20 can be implemented with separated devices. In this case, the fuzzy controller 10 and the monitor/controller 20 accomplish processing while conducting a data exchange therebetween.

Membership functions and rules for the fuzzy reasoning processing are inputted from the input unit 23 such as a keyboard to the computer so as to be stored in the memory 22. The CPU21 of the computer achieves an ordinary reasoning by use of all rules established, a trial fuzzy reasoning employing all of the established rules excepting a particular one thereof, and a comparison between an output value attained from the ordinary fuzzy reasoning and an output obtained from the trial fuzzy reasoning.

Figure 18:
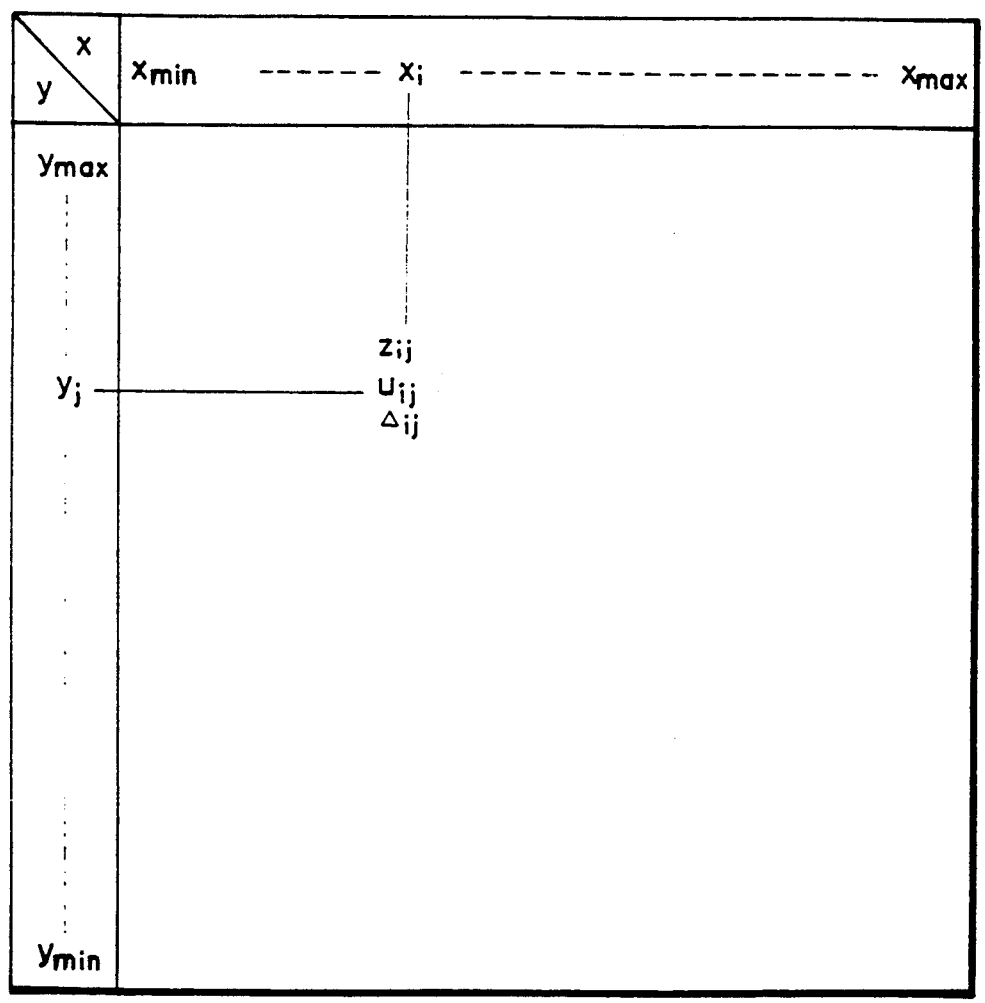

The memory 22 is loaded with, in addition to the established membership functions and rules, the result of the ordinary fuzzy reasoning and the result of the trial fuzzy reasoning. That is, in the memory 22, there is disposed a reasoning result table as shown in FIG. 18. In the reasoning result table, there are beforehand created and are stored output values $z_{ij}$ (the ordinary fuzzy reasoning result) attained by conducting the fuzzy reasoning by use of all established rules for the combinations $(x_i, y_i)$ of all values of the inputs x and y. Moreover, as will be next described, there is stored an output value (the trial fuzzy reasoning result) $u_{ij}$ obtained through the trial fuzzy reasoning executed by use of all established rules excepting a particular one thereof. In addition, a difference $\Delta_{ij} = z_{ij} - u_{ij}$ is computed between these output values and is similarly stored.

Figure 17:
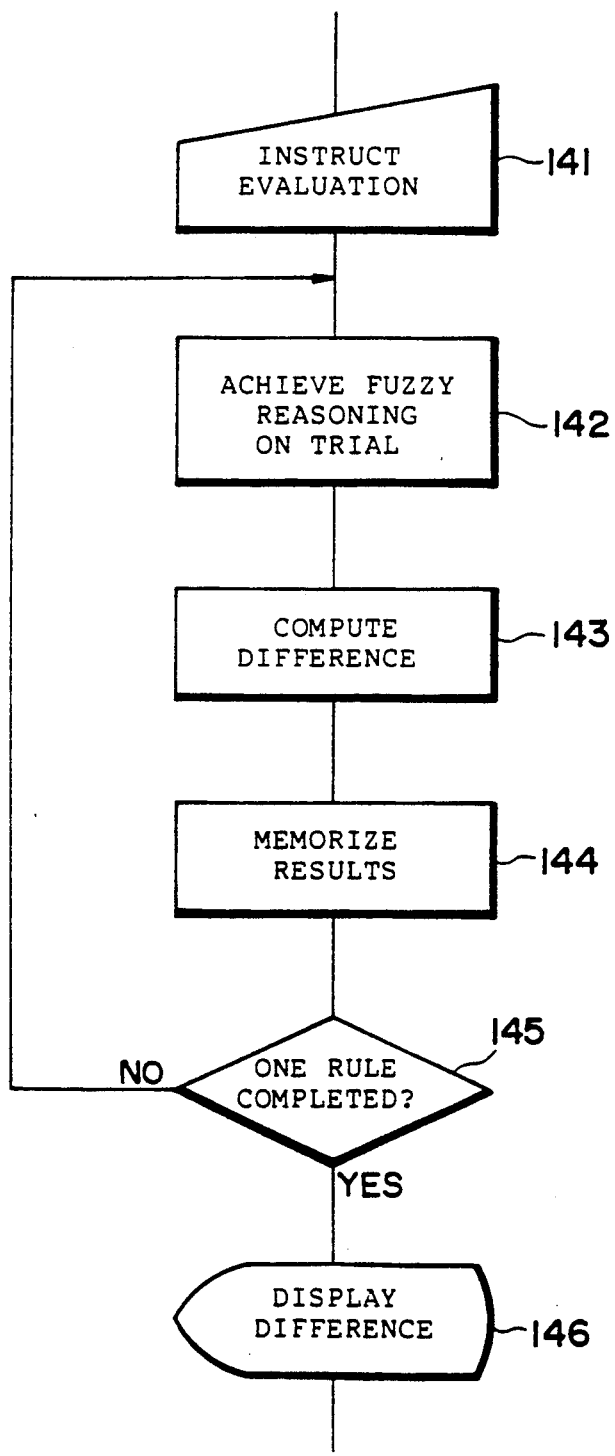
FIGS. 17 to 19 show a fourth embodiment.

FIG. 17 shows a processing procedure of an evaluation of an established rule.

When a rule evaluation processing start instruction is supplied from the keyboard of the input unit 23 (step 141), a particular rule is removed from the established rules such that a trial fuzzy reasoning is executed by use of the remaining rules (step 142). It may be possible to input from the keyboard the rule to be removed or to beforehand determine in the program or the memory a sequence of a rule to be removed. Control is accomplished such that all combinations of input values $x_i$ and $y_i$ for the trial fuzzy reasoning are sequentially generated or are produced from an input value generator externally disposed. When the trial fuzzy reasoning is completed for a pair of input values $(x_i, y_i)$ and an output value $u_{ij}$ representing a result thereof is attained, there is computed a difference $\Delta_{ij}$ between the output value $u_{ij}$ and an output value $z_{ij}$ which is already stored in the memory 22 and which represents an ordinary fuzzy reasoning result (step 143), thereby storing these values $u_{ij}$ and $\Delta_{ij}$ in the reasoning result table of the memory 22 (step 144). The processing above is executed for all combinations of the input values (step 145).

Figure 19:
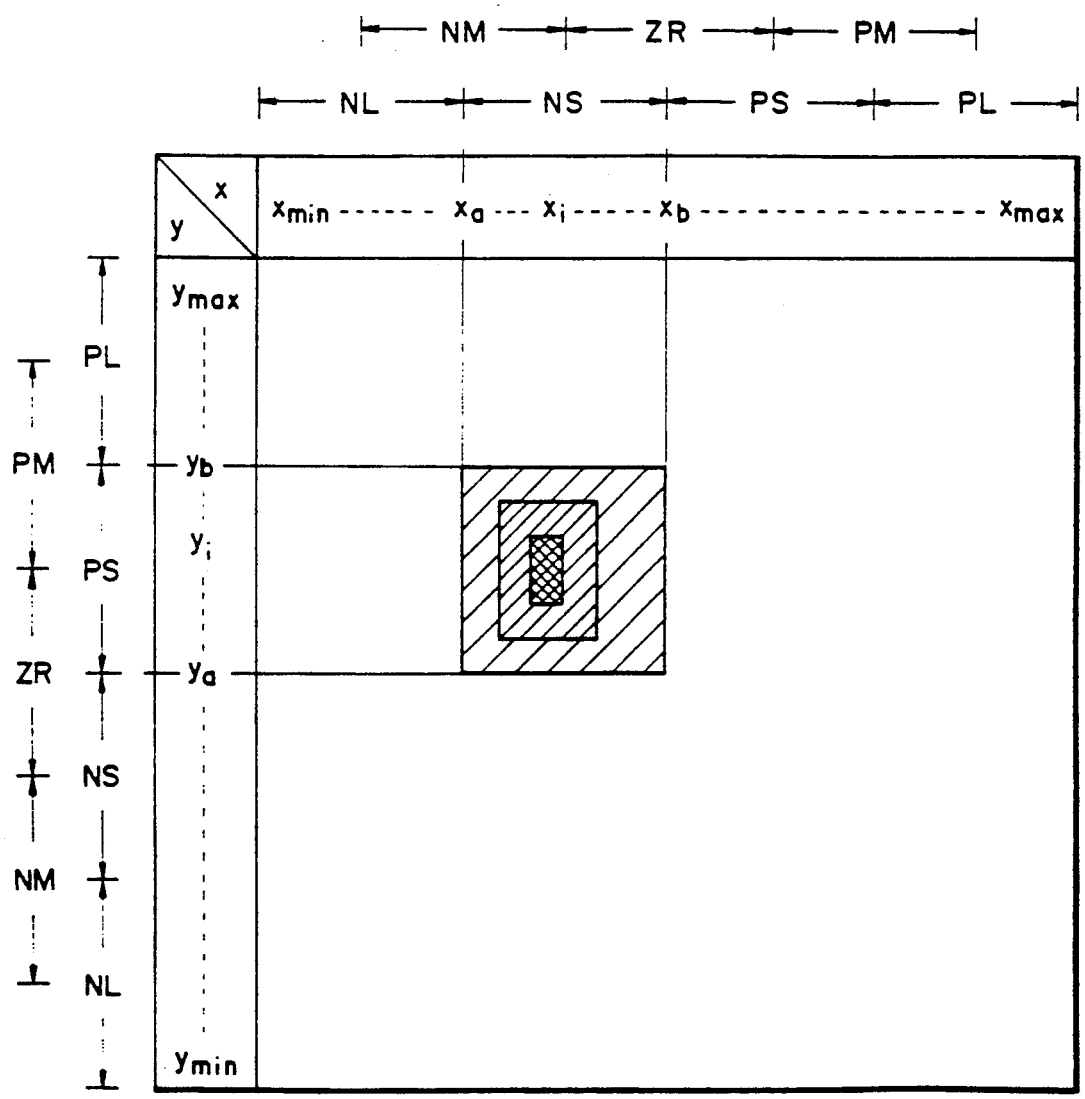

When the processing above is completed for all combinations of the input values, the computed difference $\Delta_{ij}$ is presented on the CRT display screen of the display 24 in association with the input values x and y. The display of FIG. 19 is a gradation display, namley, for the larger difference $\Delta_{ij}$, the image is displayed with an increased density. Naturally, the magnitude of the difference $\Delta_{ij}$ may be displayed by using a plurality of different colors.

When a large difference $\Delta_{ij}$ is obtained between the ordinary fuzzy reasoning result $z_{ij}$ and the result $u_{ij}$ of the trial fuzzy reasoning accomplished by removing a particular rule, the removed rule plays an important role. In contrast thereto, when the difference $\Delta_{ij}$ is small or zero, the rule exerts little influence on the ordinary fuzzy reasoning. Viewing the display of the difference $\Delta_{ij}$, the operator can judge to determine whether or not the removed rule is an essential one or whether or not the overall reasoning is rarely influenced even when the rule is removed. After the rule evaluation is thus accomplished, an unimportant rule is removed, namely, is deleted from the memory 22.

In a case where a rule is removed in a trial fuzzy reasoning and membership functions respectively related to the input and output variables x and y of the antecedent of the rule are, for example, assigned with labels NS and PS, respectively, the difference $\Delta_{ij}$ (if any) appears only in a range ($x_a$ to $x_b$ and $y_a$ to $y_b$) where the membership functions respectively represented by these labels NS and PS respectively take values other than 0. Consequently, the trial fuzzy reasoning are required to be executed only for input variables in this range, thereby increasing the computation processing for the reasoning.

In the embodiment above, the output of the difference $\Delta_{ij}$ is presented on a CRT display; however, a printer may also be employed to print the difference $\Delta_{ij}$ on a form.

As above, according to the embodiment, in response to the operation of a rule evaluation instruction, a particular rule is removed from the established rules to accomplish the trial fuzzy reasoning by using the remaining rules and then a difference is computed between an output value from the reasoning and an output value from an ordinary fuzzy reasoning so as to output the difference. Based on the output result, the rules can be evaluated such that a rule for which the difference is zero or is quite small is regarded as a rule which does not give an important influence on the fuzzy reasoning, thereby removing the rule.

As a result, there is obtained a fuzzy reasoning apparatus in which a fuzzy reasoning is achieved by use of a minimum number of necessary rules; moreover, when the fuzzy reasoning is conducted through a software processing, the processing operation speed can be increased, and when the fuzzy reasoning is executed by hardware, the configuration of the apparatus is simplified.

(6) Fifth embodiment (rule analysis and evaluation)

The fifth embodiment also evaluates an established rule. In this embodiment, conformity grades of antecedents attained in a process of a fuzzy reasoning are retained for the respective rules to compute similarity between rules through a predetermined computation processing by using the retained antecedent conformity grades so as to classify the rules into groups based on the computed similarity.

Figure 20:
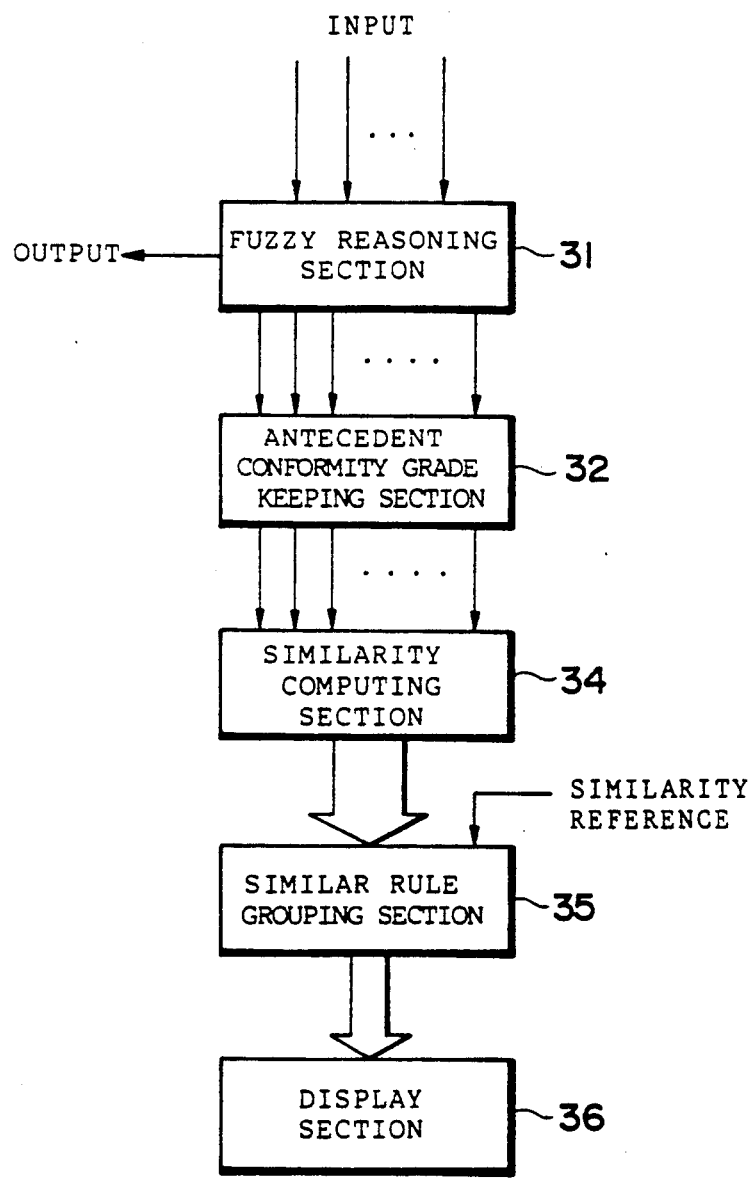
FIGS. 20 to 25 show a fifth embodiment.

FIG. 20 is a functional block diagram showing blocks attained by functionally subdividing the system configuration of FIG. 1 into several blocks. A fuzzy reasoning section 31 corresponds to the fuzzy controller 10. A conformity grade keeping section 32 is associated with the memory 22 of the monitor/controller 20 and a similarity computing section 34 and a similarity rule grouping section 35 correspond to the CPU 21. A display section 36 is associated with the display 24.

Antecedent conformity grades attained for the respective rules through the fuzzy reasoning achieved by the fuzzy reasoning section 31 are acquired by and stored in the antecedent conformity grade keeping section 32.

In this embodiment, the antecedent conformity grades of the respective rules are arranged along a time axis. An example thereof is shown in FIG. 21.

Figure 21:
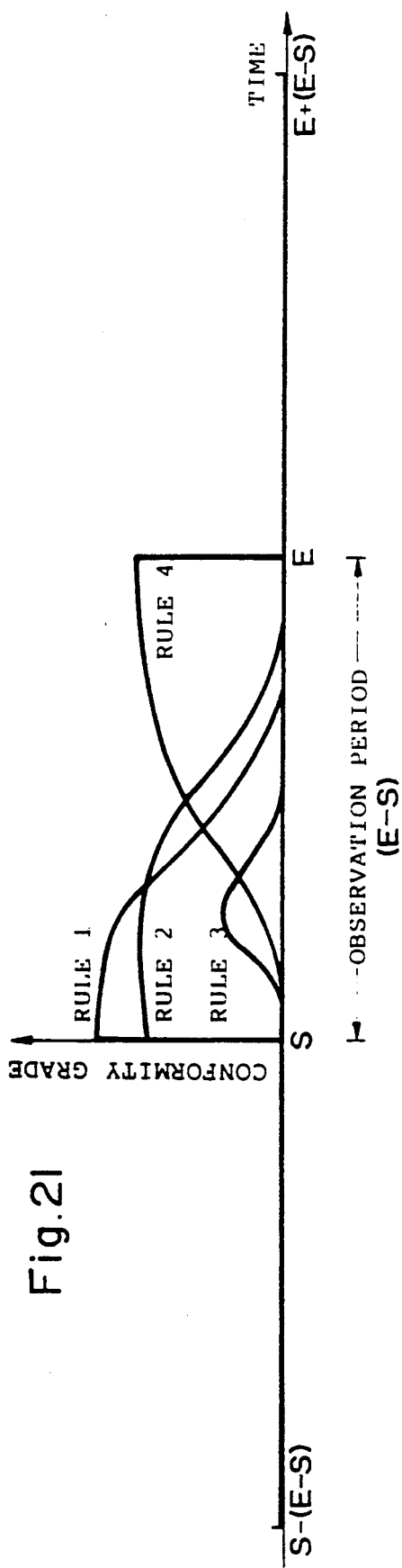

In FIG. 21, the abscissa and the ordinate stand for time (t) and conformity grades. A conformity grade of a rule i is represented as a function $f_i(t)$ with respect to time. The reasoning in the fuzzy reasoning section 31 is observed from a point of time S to a point of time E such that conformity grades $f_i(t)$ (i = 1 to m) of all rules in this observation period of time (E−S) are retained in the keeping section 32.

The similarity computing section 34 is disposed to compute similarity between rules for the antecedent conformity grades kept in the keeping section 32. The similarity $I_{ij}(\tau)$ between rules i and j is obtained by determining a correlation between conformity grades $f_i(t)$ and $f_j(t)$ thereof according to the following expression.

$$I_{ij}(\tau) = \int_{-\infty}^{+\infty} f_i(t) \cdot f_j(\tau - t) dt \quad (1)$$

Since it is impossible to accomplish the computation from $-\infty$ to $+\infty$, expression (1) is computed, for example, by establishing a substantially identical period preceding and succeeding the observation period as shown in FIG. 21. That is, the integration is accomplished in a range from S−(E−S) to E+(E−S). In the periods other than the observation period, the antecedent conformity grade is treated as zero.

Expression (1) actually becomes to be as follows.

$$I_{ij}(\tau) = \int_{S-(E-S)}^{E+(E-S)} f_i(t) \cdot f_j(\tau - t) dt \quad (2)$$

Figure 22:
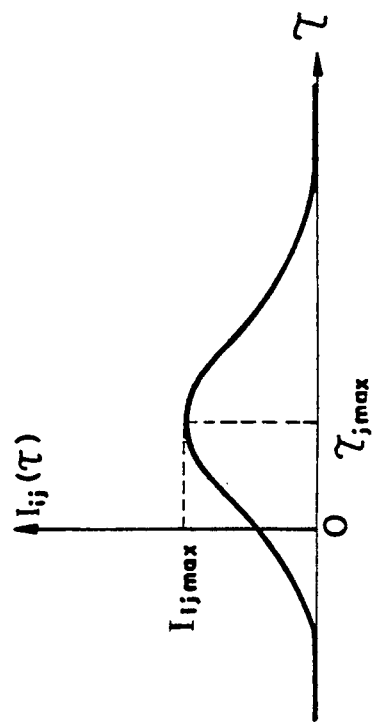

An example of the computed similarity $I_{ij}(\tau)$ is shown in FIG. 22.

Let us now consider that centered on the rule i, a similarity is obtained for the rule i and each of all other rules to classify the rule i and rules similar thereto into a group. This processing is executed primarily in the similarity rule grouping section 35 in cooperation with the similarity computing section 34.

An autocorrelation is computed for the rule i adopted as the center.

$$I_i(O) = \int_{S-(E-S)}^{E+(E-S)} f_i(t) \cdot f_i(-t) dt \quad (3)$$

Subsequently, the system attains, for the similarity $I_{ij}(\tau)$ represented by expression (2), a maximum value $I_{ijmax}$ and $\tau_{jmax}$ for which the maximum value is obtained (refer to FIG. 22).

Thereafter, for all rules j other than the rule i, $$\gamma_{ij} = I_{ijmax}/I_i(0) \quad (4)$$

$$\tau_{jmax} \quad (5)$$

are computed.

It can be considered that the larger $\gamma_{ij}$ is and the smaller $|\tau_{jmax}|$ is, the greater is the similarity between the rules i and j.

Let us assume that references (similarity references) for the similarity judgement are $\gamma_L$ and $\tau_L$. The references are externally supplied to the grouping section 35 (for example, from the keyboard of the input unit 23).

Thereafter, rules j satisfying $\tau_{ij} > \gamma_L$ and $|\tau_{jmax}| < |\tau_L|$ are gathered as a group of rules similar to the rule i (to be called a group i).

In order to avoid duplication of rules beforehand classified into a group, an arbitrary rule g not belonging to the group i is selected and then, like in the case above, expression (3) is computed for the rule g and expressions (4) and (5) are computed for other rules j not being identical to the rule g and not belonging to the group i so as to similarly produce a group centered on the rule g by use of the similarity references above.

The groups thus created are presented on the display section 36. The grouping processing is repeatedly accomplished as many times as required. While visually checking the presentation on the display section 36, the operator may judge a process state of the grouping processing to stop the grouping at an appropriate point, alternatively, a stop position may be beforehand established.

In the description above, when creating a group g centered on a rule g, the rules belonging to the group i beforehand generated are excluded; however, these rules need not be necessarily excluded. With provision of this operation, it is possible to know a state of duplication between the similar rules.

In the embodiment above, there are obtained the similarity between rules for the antecedent conformity grades. This helps detect similar rules and evaluate rules for a removal of unnecessary rules and the like.

The system may also judge to determine whether or not similarity exists between rules for a change rate of the antecedent conformity grade. A result of this operation helps detect rules of which the effect (effectiveness) is similar to each other and the like. A constitution for this purpose is shown as a first variation example in FIG. 23. When compared with the embodiment of FIG. 20, the similarity computing section 34 is replaced with a change rate similarity computing section 34A and a conformity grade change rate computing section 33 is disposed between the keeping section 32 and the computing section 34A in FIG. 23. This computing section 33 is employed to compute and to keep therein a differentiated value i.e. a change rate of the antecedent conformity grade for each rule kept in the keeping section 32. Using the change rate, the system then conducts a computation according to the expression (2) to (5) described above and achieves a grouping operation based thereon. The similarity computing section 34A and the conformity grade change rate computing section 33 are also realized by the CPU 21.

Figure 24:
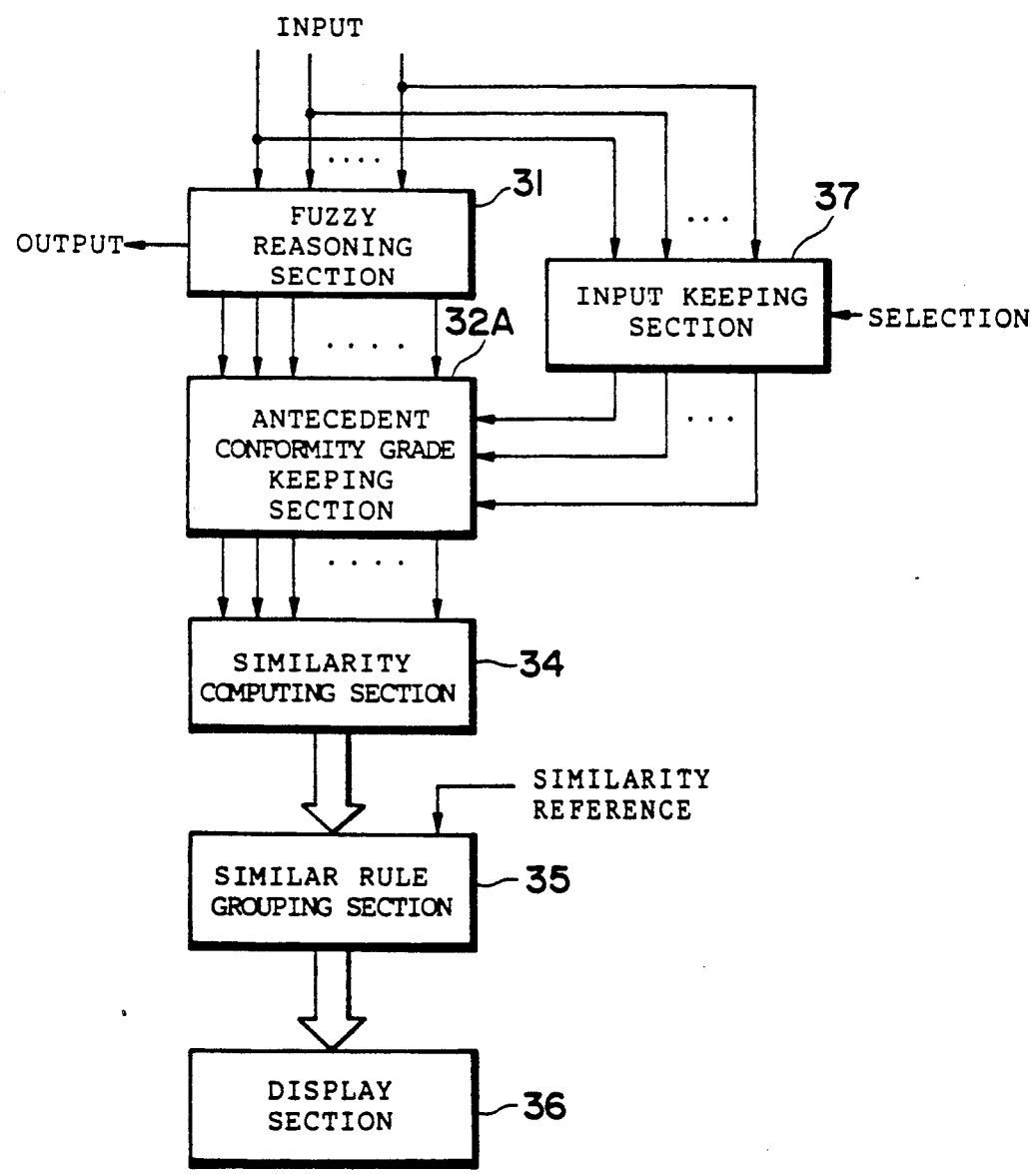
Figure 25:
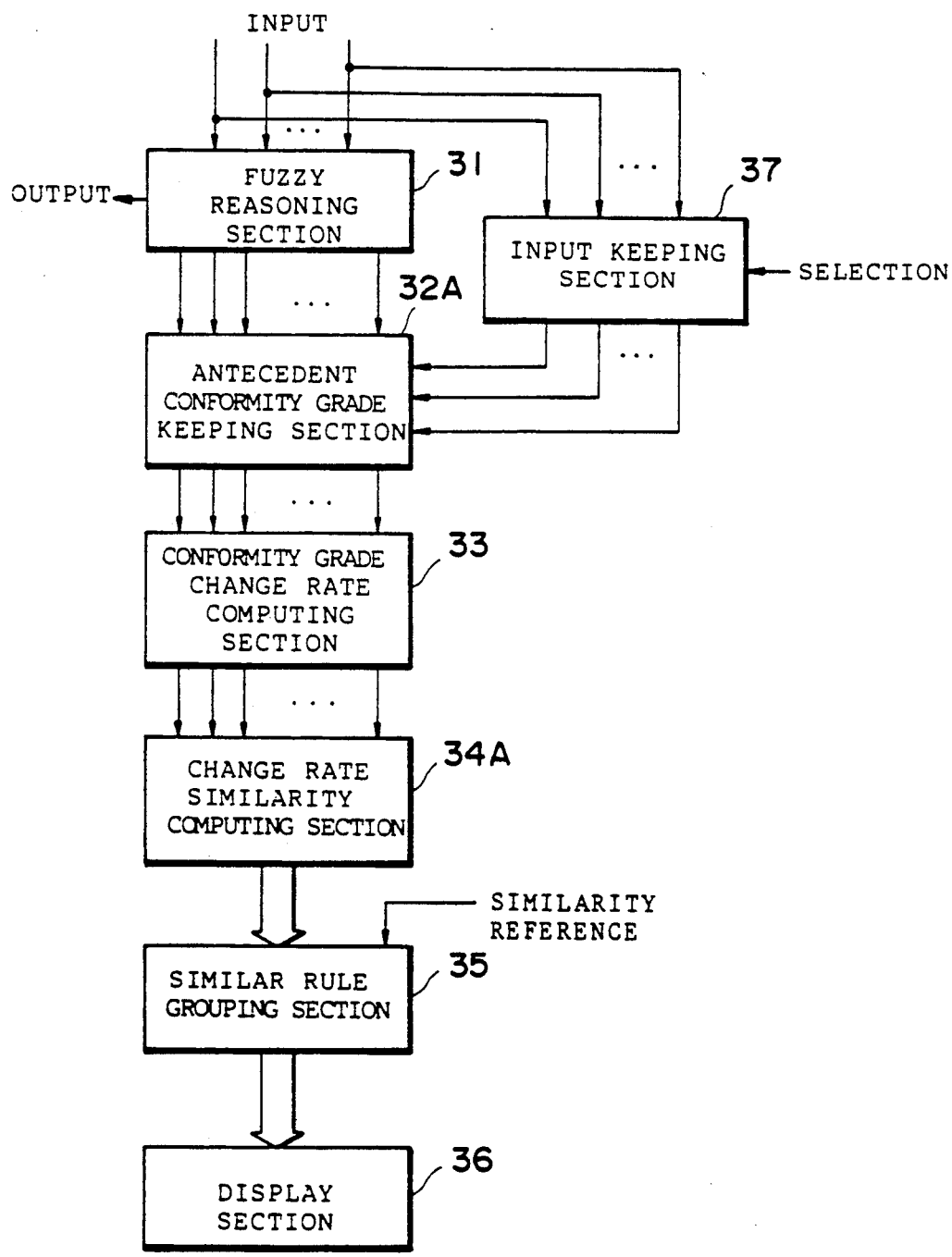

In the embodiment and the first variation example, the variable (abscissa) of the antecedent conformity grade or the change rate thereof is time (t) (refer to FIG. 21); however, the variable may be another physical quantity, for example, one of (for example, temperature) of the inputs to the reasoning section 31. FIGS. 24 and 25 show, as second and third variation examples, configurations for the grouping of similar rules based on the antecedent conformity grade or the change rate thereof with the input used as the variable.

Figure 23:
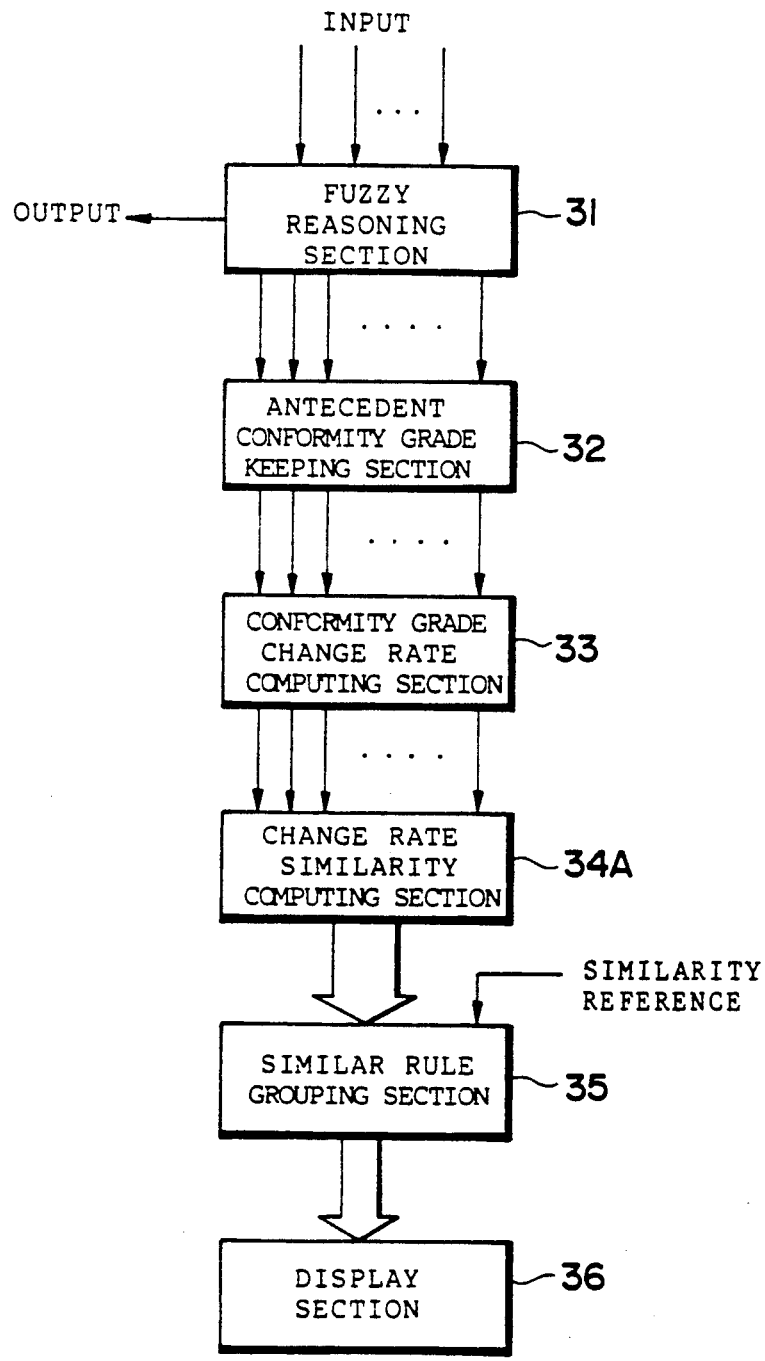

In FIGS. 24 and 25, the same components as those shown in FIGS. 20 and 23 are assigned with the same reference numerals. In these diagrams, there is disposed an input keeping section 37. The input keeping section 37 is employed to select, from inputs of a plurality of kinds supplied to the fuzzy reasoning section 31, inputs of a kind in response to a selection instruction from an external device and to keep the values of the selected inputs of the kind in an order of the inputs so as to supply the values to the antecedent conformity grade keeping section 32A. The input keeping section 37 is implemented, for example, by the memory 22. The antecedent conformity grade keeping section 32A rearranges the antecedent conformity grades obtained from the reasoning section 31, in accordance with the input values fed by the keeping section 37, such that the input values constitute variables (abscissa) and creates data as shown in FIG. 21 (the abscissa, however, does not stand for time but denotes kinds of inputs) for each rule. Based on the antecedent conformity grade thus generated with the inputs set as variables, similar rules are collected as a group in the method described above.

As above, the grouping of similar rules can be accomplished for each input variable.

(7) Sixth embodiment (evaluation of established rule)

In this embodiment, after the rules are established, utilization frequencies are computed for input and output variables in the established rules so as to check an importance of each of the input and output variables, the overall balance, and the like.

The memory 22 is employed to store therein data, as shown in FIG. 26, representing fuzzy reasoning rules inputted from the input unit 23. In the rules already described, for simplicity of explanation, the antecedent includes two kinds of input variables i.e. x and y; however, in general, it is possible to establish input variables of a plurality of kinds. The rule can be expressed in a generalized form as If $x_1=A, x_2=B, \ldots, x_e=E$, then $z=F$ where, $x_1, x_2, \ldots, x_e$ denote input variables and z designates an output variable. Letters A, B, ..., E, and F are labels of membership functions. Let us assume that $x_1=A$, $x_2=B$, and $x_e=E$ are propositions 1, 2, and e. FIG. 26 shows the structure of data of the rules thus generalized. The number of variable names of proposition 1 is not limited to one i.e. variable names of an arbitrary number of kinds may be established. These are indicated as aaaa, abaa, abca, etc. in FIG. 26. This is also applicable to the other propositions.

Figures 27, 28:
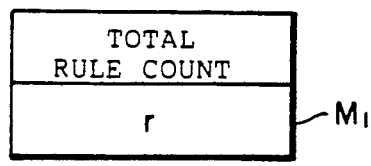

In the memory 22, there are further disposed, as shown in FIGS. 27 and 28, an area $M_1$ for storing therein the total number of established rules and an area $M_2$ for storing therein the variable utilization frequency for each variable name. The contents of these storage areas $M_1$ and $M_2$ are updated in association with a count operation achieved by the CPU 21.

When the operator inputs a rule from the input unit 23, the count value of the area $M_1$ is incremented by one. In consequence, when all rules are completely inputted, the total number r of established rules is stored in this area $M_1$.

Next, when the operator desires to confirm the utilization frequencies of variables used in a rule creation, the operator supplies from the input unit 23 a count instruction of the utilization frequency for each variable name. Then a count processing as shown in FIG. 29 is executed by the CPU 21.

Figure 29:
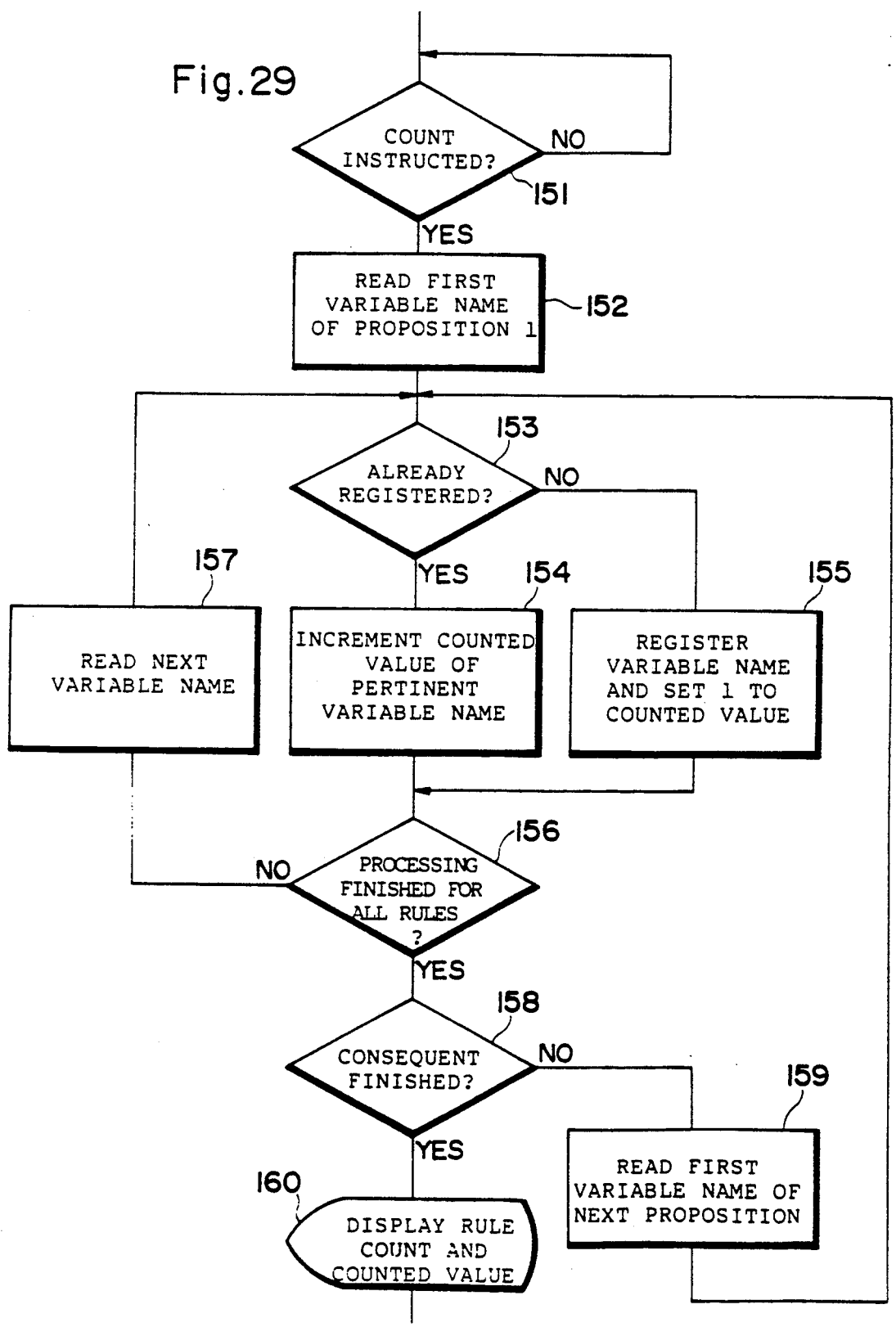

In FIG. 29, when a count instruction is supplied (step 151), a variable name of a first item (rule 1) of proposition 1 is read out from the rule data beforehand established and stored in the memory 22 (step 152). In this count processing, the variable names are sequentially checked in a vertical direction in the rule data structure shown in FIG. 26. Namely, first, the variable name of proposition 1 is checked for all rules and then control transfers to processing of the variable name of proposition 2.

Whether or not the read-out variable name has already been registered to the area $M_2$ is checked (step 153). If this is not the case, the variable name is registered to the area $M_2$ and one is set as a counted value of the variable name (step 155). Otherwise, one is added to the counted value of the pertinent variable name (step 154). Variable names of proposition 1 are sequentially read out from the rule data of memory 22 in a rule number sequence (step 157) so as to repeatedly accomplish the processing above (steps 153 to 155). When the processing is completed to reach the rule r (step 156), a variable name of the first item (rule 1) of proposition 2 is then read out (step 159) to repeatedly conduct the processing of the steps 153 to 157 in a similar manner. Thereafter, when the processing is completely achieved up to the variable names of the rule r of the consequent, the count processing is terminated (step 158). As a result, the utilization frequencies are counted and are stored in the area $M_2$ for all variable names.

After this operation, the total rule count r of the area $M_1$ of the memory 22 and the counted values of the respective variable names of the area $M_2$ thereof are displayed on the display 24 (step 160). The total rule count r need not be necessarily displayed. Moreover, the variable names and the counted values thereof may be continuously displayed during the processing of FIG. 29. In this case, the operator can sequentially recognize a state in which the variable names are registered and a state in which the counted values are incremented.

In the embodiment above, although the utilization frequency is counted for each variable name in the rules, a frequency of assignment of an identical label may be counted for each variable name.

As described above, in accordance with this embodiment, after the fuzzy reasoning rules are established, the utilization frequency is automatically counted and is displayed for each variable name used in the rules; consequently, the overall balance related to the utilizations of variables in the established rules, importance of each variable, and the like can be obtained to accomplish an evaluation thereof.

(8) Seventh embodiment (judgement of adequacy of rule being established)

In the seventh embodiment, when a fuzzy reasoning rule is established, a judgement is conducted to determine whether or not an inputted rule is adequate; and if this is not the case, the condition is notified.

For example, FIG. 30 shows a rule table representing fuzzy reasoning rules for use in a motor rotation angle control. Input variables include an angular deviation x and an angular velocity deviation y, and an output is a current command value z. In a range A where the angular deviation x and the angular velocity deviation y are both "positive" (labels including P), the output variable z is also "positive" (a label including P); whereas, in a range B where the angular deviation x and the angular velocity deviation y are both "negative" (labels including N), the output variable z is also "negative" (a label including N). In contrast thereto, it has been known from experience that in ranges C and D where either one of the angular deviation x and the angular velocity deviation y is "positive" and the other one thereof is "negative", the output variables also includes "positive" and "negative" values.

However, when the rules are not correctly established due to an input operation error, a wrong rule may prevent a normal control of the motor rotation angle and hence may lead to a danger of an accident or the like.

The seventh embodiment prevents the operator from establishing an erroneous rule.

In the memory 22, there are stored a rule table for establishing items which is not loaded with labels of membership functions of consequents as shown in FIG.

31 and a rule table for judgement which has been loaded with adequate ranges of labels of membership functions of consequents as shown in FIG. 32. The labels of the membership functions are assigned with orders of magnitude, namely, in a sequence of NL<NM<NS<ZR<PS<PM<PL. In the rule table for judgement, there are beforehand established in pertinent cells with inequality signs the ranges (adequate ranges) of membership functions of consequents which are allowed to be established for the combinations of labels assigned to membership functions of the input variables x and y of antecedents. For example, z≧PS indicates that the labels PS, PM, and PL are allowed to be established.

Figure 31:
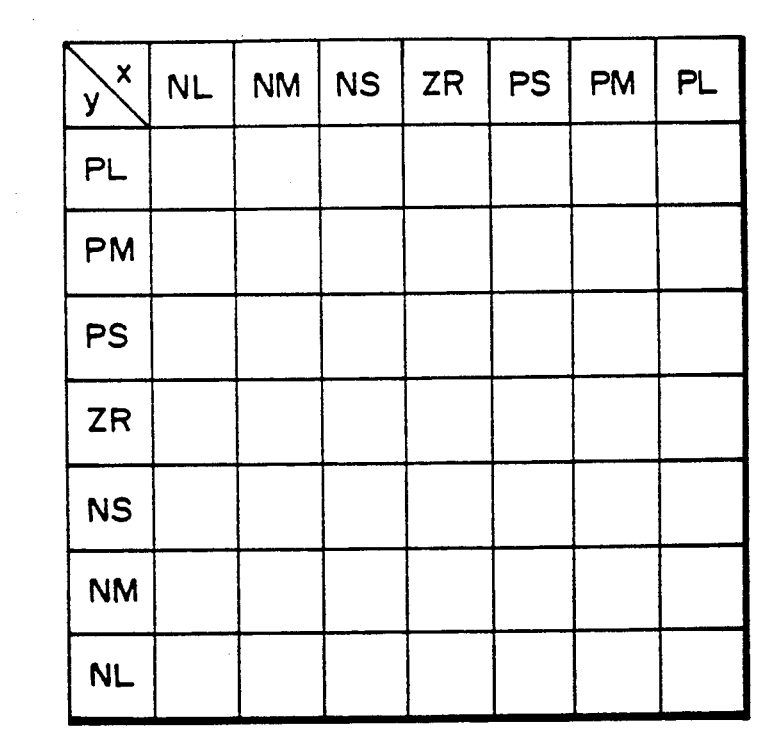
Figure 33:
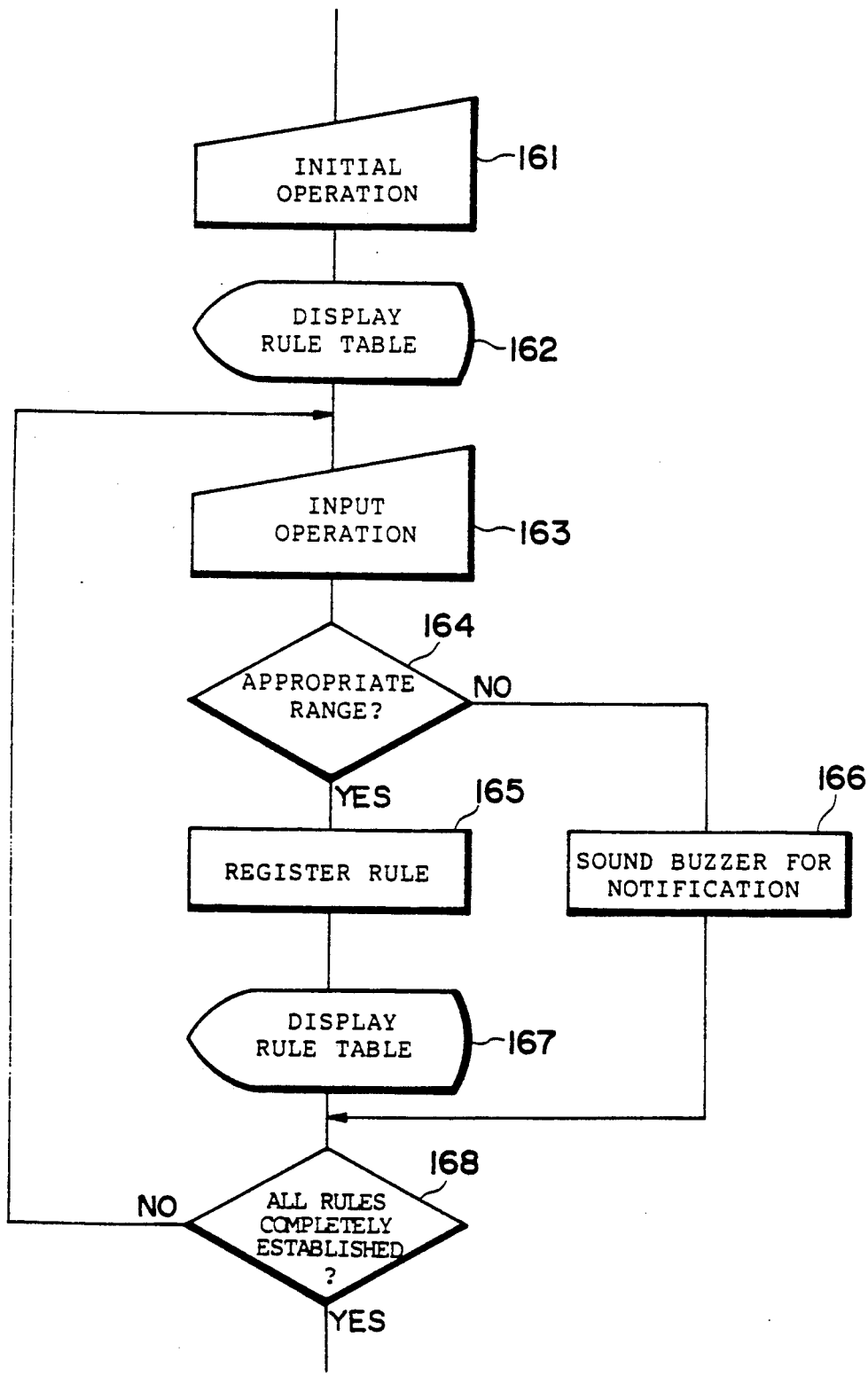

FIG. 33 shows a rule establishing processing procedure. Rules are established by using the keyboard or the mouse of the input unit 23. When an initial operation is accomplished from the input unit 23 (step 161), the rule table for establishing items (FIG. 31) stored in the memory 22 is presented on the CRT of the display 24 (step 162). The operator then sequentially inputs labels for membership functions of consequents in the required cells of the rule table. For example, the operator inputs a consequent label NL at a position for which the input variable x is NM and the input variable y is PL in the rule table for establishing items (step 163). The consequent label is compared with the adequate range data established in the associated cell of the rule table for judgement (FIG. 32). In the position for which the input variable x is NM and the input variable y is PL in the rule table for establishing items, an adequate range has not been established; consequently, in this case, the input consequent label is directly written and is registered to the rule table for establishing items (step 165) and then the consequent label NL is displayed on the rule table for establishing items (step 167). Subsequently, whether or not all rules have been completely established is judged (step 168). If this is not the case, control returns to the step 163.

The consequent labels are sequentially written and are registered as described above. And, for example, if NL is erroneously inputted as a consequent label in a cell for which x is PL and y is PL In the step 163, since this is beyond the adequate range of z≧PS the buzzer 25 is sounded (step 166). As a result, the operator recognizes an input error and hence can input a correct consequent label PL in the position.

Since the central position of the rule table for judgement, namely, a position for which x is ZR and y is ZR is loaded with ZR as consequent label establishing data, only ZR is allowed to be inputted in this position.

When all rules are completely established, the operation is terminated, thereby obtaining a control rule table as shown in FIG. 30.

The description above is related to a rule establishing operation; however, the rule modifying operation is also accomplished in a similar manner. Also when rewriting a consequent label, if an inputted label is beyond the adequate range, the buzzer 25 sounds.

FIG. 34 shows another display example of the control rule table. In this display example, only consequent label establishing data ZR in a position for which x is ZR and y is ZR is presented in a different mode (for example, with bold lines or in a different color). Such a display prevents the consequent label ZR from being erroneously rewritten in the rule modification.

The display may be achieved in a mode, without using the rule table format, in which the rules are sequentially displayed in a linguistic format as shown in FIG. 35.

As shown in FIG. 36, it may also be considered that adequate ranges (ZR, NS, NM, and NL shown in parentheses) are displayed in the rules to prevent a wrong establishing operation.

Moreover, in the embodiment above, the buzzer 25 is used to notify the wrong establishing operation; however, there may be adopted a constitution in which the wrong establishing operation is notified by the screen display on the CRT.

As above, according to this embodiment, each time a fuzzy reasoning rule is established, labels of an inputted consequent are checked to determine whether or not the labels are within predetermined adequate ranges such that if this is not the case, the condition is notified. With this notification, the operator can recognize an error in the rule establishing operation. In this manner, an erroneous rule establishing operation due to an operator's error is prevented.

Industrial Applicability

A method of and an apparatus for evaluating membership functions or rules in accordance with the present invention are employed to judge, when a membership function or a rule is established in a fuzzy reasoning apparatus, whether or not the function or the rule is adequate or appropriate and are utilized to secure an appropriate operation of the fuzzy reasoning apparatus.

We claim:

1. An apparatus for evaluating rules in a fuzzy reasoning system comprising:

means provided with a plurality of membership functions established for each of input variables of at least two kinds and a plurality of membership functions established for output variables of at least one kind for executing in response to an input value a fuzzy reasoning based on predetermined rules beforehand established;

means for determining, when an input value is supplied, an antecedent conformity grade of the input value and a change rate thereof; and a display device for displaying the determined antecedent conformity grade and a change rate thereof for each of the rules.

2. An apparatus for evaluating rules in a fuzzy reasoning system comprising:

means provided with a plurality of membership functions established for each of input variables of at least two kinds and a plurality of membership functions established for output variables of at least one kind for executing in response to an input value a fuzzy reasoning based on predetermined rules beforehand established;

means for determining, when an input value is supplied, a conformity grade of the input value for each of the membership functions and a change rate thereof; and a display device for displaying the determined conformity grade for each of the membership functions and a change rate thereof.

3. An apparatus for evaluating rules in a fuzzy reasoning system comprising:

means provided with a plurality of membership functions established for each of input variables of at least two kinds and a plurality of membership functions established for output variables of at least one kind for executing in response to an input value a fuzzy reasoning based on predetermined rules beforehand established;

means for determining, when an input value is supplied, a value related to a conformity grade of the input value; and a display device for displaying a change of the determined value related to the conformity grade with time set along an abscissa.

4. An apparatus for evaluating rules in a fuzzy reasoning system comprising:

means provided with a plurality of membership functions established for each of input variables of at least two kinds and a plurality of membership functions established for output variables of at least one kind for executing in response to an input value a fuzzy reasoning based on predetermined rules beforehand established;

means for determining, when an input value is supplied, a value related to a conformity grade of the input value and a change rate thereof; and a display device for displaying a change of the determined value related to the conformity grade with input variables set along an abscissa.

5. An apparatus for evaluating rules in a fuzzy reasoning system comprising:

means provided with a plurality of membership functions established for each of input variables of at least two kinds and a plurality of membership functions established for output variables of at least one kind for executing in response to an input value a fuzzy reasoning based on predetermined rules beforehand established;

arithmetic means for computing display position coordinates of input values in a rule table which represents for all rules established, in a form of a table, antecedent membership functions and consequent membership functions; and display means for displaying the rule table and a graphic image which is superimposed onto the rule table and which is drawn according to a change of the input value with respect to time based on the computed display position coordinates.

6. An apparatus for evaluating rules in a fuzzy reasoning system comprising:

means provided with a plurality of membership functions established for each of input variables of at least two kinds and a plurality of membership functions established for output variables of at least one kind for executing in response to an input value a fuzzy reasoning based on predetermined rules beforehand established;

means for keeping a value attained in a fuzzy reasoning process and related to an antecedent conformity grade by using a predetermined physical quantity as a variable for a predetermined range of the physical quantity;

means for computing similarity between rules for the value retained by the keeping means and related to an antecedent conformity grade; and means for classifying the rules into groups based on the computed similarity.

7. An apparatus for evaluating rules in accordance with claim 6 wherein the value related to the antecedent conformity grade is an antecedent conformity grade or a change rate thereof.

8. An apparatus for evaluating rules for a fuzzy reasoning system comprising:

an input device for establishing and storing rules for a fuzzy reasoning;

means for determining a utilization frequency of each variable in the fuzzy reasoning rules established and stored by the input means; and a display device or a printer for displaying or printing out the utilization frequency for each variable.

9. An apparatus for evaluating rules for a fuzzy reasoning system:

an input device for establishing and storing rules for a fuzzy reasoning;

means for beforehand storing, for a combination of antecedent membership functions, a range in which a consequent membership function is appropriately established;

means for judging, when a consequent membership function is inputted from the input device, whether or not the inputted membership function is within the appropriate range stored in the storing means; and means for notifying, when the inputting consequent membership function is judged to be beyond the appropriate range, the condition.

10. A method of evaluating membership function in a fuzzy reasoning system which keeps a plurality of membership functions established for each of input variables of at least two kinds and a plurality of membership functions established for output variables of at least one kind and which is responsive to an input value to execute a fuzzy reasoning based on predetermined rules beforehand established comprising:

computing, when an input value is supplied, a antecedent conformity grade of the input value and a change rate thereof;

displaying on a display device a state of changes with respect to time of the computed antecedent conformity grade and the change rate thereof with time set along an abscissa.

11. A method of evaluating rules in a fuzzy reasoning system which keeps a plurality of antecedent membership functions established for each of input variables of at least two kinds and a plurality of consequent membership functions established for output variables of at least one kind and which is responsive to an input value to execute a fuzzy reasoning based on predetermined rules beforehand established comprising:

computing, when an input value is supplied, display position coordinates of the input value in a rule table which represents for all rules established, in a form of a table, labels of antecedent membership functions and labels of consequent membership functions; and displaying a graphic image which is superimposed onto the rule table and which is drawn according to a change of the input value with respect to time based on the computed display position coordinates.

12. A method of evaluating rules in a fuzzy reasoning system which keeps a plurality of membership functions established for each of input variables of at least two kinds and a plurality of membership functions established for output variables of at least one kind and which is responsive to an input value to execute a fuzzy reasoning based on predetermined rules beforehand established comprising:

keeping the value obtained in the fuzzy reasoning process and related to an antecedent conformity grade by using a predetermined physical quantity as a variable for a predetermined range of the physical quantity;

computing similarity between rules for the retained antecedent conformity grades; and classifying the rules into groups based on the computed similarity.

13. A method of evaluating rules for a fuzzy reasoning in a system including input means for establishing rules for a fuzzy reasoning comprising:

beforehand storing adequate establishing ranges of consequent membership functions for combinations of antecedent membership functions;

checking to determine, when a consequent membership function is inputted from the input means, whether or not the inputted membership function is within the adequate range; and notifying, when the inputted consequent membership function is judged to be beyond the adequate range, the condition.

* * * * *